US008726576B2

(12) United States Patent
Kobayashi et al.

(10) Patent No.: US 8,726,576 B2
(45) Date of Patent: May 20, 2014

(54) GLASS RUN CHANNEL ASSEMBLY

(75) Inventors: Yosuke Kobayashi, Aichi (JP);
Kazuhiro Funada, Aichi (JP)

(73) Assignee: Tokai Kogyo Co., Ltd., Obu-shi (JP)

( * ) Notice: Subject to any disclaimer, the term of this patent is extended or adjusted under 35 U.S.C. 154(b) by 0 days.

(21) Appl. No.: 13/814,131

(22) PCT Filed: Aug. 4, 2011

(86) PCT No.: PCT/JP2011/067859
§ 371 (c)(1),
(2), (4) Date: Mar. 14, 2013

(87) PCT Pub. No.: WO2012/018078
PCT Pub. Date: Feb. 9, 2012

(65) Prior Publication Data
US 2013/0168995 A1 Jul. 4, 2013

(30) Foreign Application Priority Data

Aug. 5, 2010 (JP) ................................ 2010-176713
Aug. 5, 2010 (JP) ................................ 2010-176714

(51) Int. Cl.
*E06B 7/16* (2006.01)
(52) U.S. Cl.
USPC ........................................ 49/479.1; 49/441
(58) Field of Classification Search
USPC ................. 49/440, 441, 495.1, 489.1, 475.1, 49/479.1, 492.1
See application file for complete search history.

(56) References Cited

U.S. PATENT DOCUMENTS

| | | | | | |
|---|---|---|---|---|---|
| 3,213,494 | A | * | 10/1965 | Mayers et al. | 49/492.1 |
| 3,309,817 | A | * | 3/1967 | Fisher | 49/492.1 |
| 4,864,774 | A | * | 9/1989 | Onishi et al. | 49/440 |
| 5,367,830 | A | * | 11/1994 | Omura et al. | 49/475.1 |
| 5,607,198 | A | * | 3/1997 | Wirsing | 296/146.16 |
| 5,918,421 | A | * | 7/1999 | Nozaki | 49/492.1 |
| 6,073,936 | A | * | 6/2000 | Kirchmann et al. | 277/640 |
| 6,820,372 | B2 | * | 11/2004 | Nozaki | 49/498.1 |
| 7,294,386 | B2 | * | 11/2007 | Murase et al. | 428/99 |
| 7,487,615 | B2 | * | 2/2009 | Watanabe et al. | 49/441 |
| 7,533,495 | B2 | * | 5/2009 | Teramoto et al. | 49/441 |
| 8,312,675 | B2 | * | 11/2012 | Thiele | 49/27 |

(Continued)

FOREIGN PATENT DOCUMENTS

| | | |
|---|---|---|
| JP | U-63-173862 | 11/1988 |
| JP | A-2007-196909 | 8/2007 |
| JP | A-2008-239105 | 10/2008 |
| JP | A-2010-179818 | 8/2010 |

OTHER PUBLICATIONS

International Preliminary Report on Patentability issued in International Application No. PCT/JP2011/067859 dated Mar. 12, 2013.

(Continued)

*Primary Examiner* — Jerry Redman
(74) *Attorney, Agent, or Firm* — Oliff PLC

(57) ABSTRACT

A glass run channel assembly of the invention includes a connecting glass run channel that is connected to first and second glass run channels, respectively. A base bottom portion of the connecting glass run channel is formed with an insertion hole to which an engaging member can be attached, and lateral inner walls that configure the periphery of the insertion hole are formed with locking portions that are locked to a trunk portion when the engaging member is inserted into the insertion hole.

25 Claims, 13 Drawing Sheets

(56) References Cited

U.S. PATENT DOCUMENTS

2007/0175102 A1 8/2007 Teramoto et al.
2010/0199568 A1 8/2010 Kondo et al.

OTHER PUBLICATIONS

International Search Report issued in International Application No. PCT/JP2011/067859 dated Nov. 15, 2011.

* cited by examiner

GLASS RUN CHANNEL ASSEMBLY

TECHNICAL FIELD

The present invention relates to a glass run channel assembly equipped in a window frame of a vehicle.

Priority is claimed on JP-A-2010-176713, filed on Aug. 5, 2010, and JP-A-2010-176714, filed on Aug. 5, 2010, the contents of which are incorporated herein by reference.

BACKGROUND ART

Generally, a window frame provided in a vehicle, such as a car, particularly, a window frame (also referred to as a door frame in this case) provided in a door panel body of a sliding door, a front door, a rear door, or the like, is equipped with a glass run channel assembly (also referred to as a glass run, a glass run channel, a run channel, a guide member, etc.). The glass run channel assembly for this application is a groove forming member (long molding member) that is molded in an elongated shape and that has a substantially U-shaped cross-sectional shape. The glass run channel assembly is mounted in a groove formed in the window frame, thereby guiding the up and down of a window pane made of glass that moves up and down inside a member (for example, a door panel) that configures a vehicle. Generally, the glass run channel assembly is manufactured by an extrusion molding or the like by using an elastic polymeric material, such as rubber or thermoplastic elastomer.

This type of glass run channel assembly corresponds to the shape of the window frame. This type of glass run channel assembly is configured by a plurality of glass run channels that is molded in an elongated shape by extrusion molding and a connecting glass run channel arranged at a corner portion of the window frame as a molded article that connects at least two elongated glass run channels. Generally, this connecting glass run channel is molded by injection molding.

In this type of glass run channel assembly, there is a fear that positional deviation may be caused from a predetermined mounted position due to the stress that acts when the glass window pane moves up and down. Accordingly, an idea for preventing the positional deviation is required. As one of the means that prevents such positional deviation, integrally providing a projection for preventing movement at the corner portion (that is, the above connecting glass run channel) of the window frame is known. By bringing this projection into contact with a portion of a window frame component member, it is possible to regulate the movement (positional deviation) of the glass run channel assembly accompanying the up and down of the window frame.

For example, Patent Document 1 discloses a glass run channel assembly and its manufacturing method characterized in that an insert member made of a material harder than a die-forming portion is arranged in a region (die-forming portion) equivalent to a corner portion of a glass opening in a glass run channel assembly, and the surface of the region of the insert member equivalent to the projection is coated with a material (that is, a relatively soft material) that configures the die-forming portion.

CITATION LIST

Patent Literature

[Patent Document 1]: JP-A-2007-196909

SUMMARY OF INVENTION

However, the following problems are conceivable in the technique described in the above Patent Document 1.

(1) That is, in the above technique, it is necessary to arrange the above insert member that configures the projection within the molding die, and inject molten material that configures the die-forming portion into the molding die, thereby molding the die-forming portion integrated with the insert member. For this reason, it is necessary to fix a hard insert member within a die-forming portion to be used, and therefore, the structure of the molding die to be used becomes complicated. Additionally, since the insert member is present within a cavity, the flow of molten resin is obstructed, or the heat of the molten resin is lost. Thereby, a short shot in which the molten resin is not sufficiently spread to the cavity may be caused.

(2) Additionally, with the problem of the above (I), there is a fear that an unrestorable defective article may be formed in a case where the insert member has not been correctly arranged at a predetermined regular position within the molding die with a complicated structure, in a case where the insert member itself has not been inserted into the die, or in a case where the insert member has been displaced due to the pressure of the injected resin. Additionally, in a case where the molding die is closed in a state where the insert member has not been correctly arranged at a predetermined regular position, there is also a fear that the molding die may be damaged.

Moreover, there is a great constraint in practical use that a material having a heat durability of such a degree that it does not deteriorate in a molding process when the die-forming portion is injection-molded should be used as a material for the insert member.

Thus, the invention has been invented in order to solve the above problems (1) and (2), and an object thereof is to provide a glass run channel assembly of a configuration capable of exactly and stably forming a projection serving as the above positional deviation preventing means at a predetermined position. Additionally, another object of the invention is to provide a glass run channel product including such a glass run channel assembly.

In order to realize the above object, the invention provides a glass run channel assembly mounted on a window frame of a vehicle.

That is, the glass run channel assembly of the invention is a glass run channel assembly mounted on a vehicle.

The glass run channel assembly of the invention includes a first elongated glass run channel of a predetermined length that is extrusion-molded in a predetermined cross-sectional shape from an elastic polymeric material; a second elongated glass run channel of a predetermined length that is extrusion-molded in a predetermined cross-sectional shape from an elastic polymeric material; and a connecting glass run channel that is a glass run channel injection-molded from an elastic polymeric material and connects integrally longitudinal terminals of the first and second glass run channels.

Further, the first and second glass run channels and the connecting glass run channel include, a base bottom portion arranged at a position that faces an end face of an up and down moving window pane, which moves up and down while being guided by a window frame, when each glass run channel is mounted within a groove formed at a predetermined position of the window frame of a vehicle; a side wall portion that integrally projects toward an inner circumferential side from the base bottom portion at a predetermined intersection angle with respect to the base bottom portion from at least a vehicle interior end of the base bottom portion in a width direction; and a seal lip that projects toward the base bottom portion in a folded shape from a protruding tip side of the side wall portion, The base bottom portion of the connecting glass run channel is formed with an insertion hole to which an engaging member is configured to be attached, the engaging member being molded in advance from a material that is harder and more rigid than the elastic polymeric material of the connecting glass run channel and including: a base portion that is arranged at the base bottom portion; and a trunk portion that projects in a direction away from the base portion and that is formed so as to be engageable with an engaging portion provided within the groove of the window frame when the connecting glass run channel is mounted on the window frame.

An inner wall that configures the periphery of the insertion hole is formed with a locking portion that is locked to the trunk portion of the engaging member when the engaging member is inserted into the insertion hole.

In the glass run channel assembly of the invention of this configuration, the base bottom portion of the connecting glass run channel is formed with the insertion hole into which the engaging member can be inserted. Further, the inner wall that configures the periphery of this insertion hole is formed with the locking portion.

Therefore, according to the glass run channel assembly of the invention, unlike the conventional art example described in the above Patent Document 1 that requires the projection to be integrally molded by an injection molding method within the molding die into which an insert member is inserted, it is possible to form the projection that is a positional deviation preventing means by the easy operation of attaching the engaging member, which is separately molded in advance, afterward. Additionally, since the engaging member may be attached to the connecting glass run channel (base bottom portion) afterward, constraints on the material and shape that configure the engaging member can also be reduced.

Moreover, when the engaging member is attached to the base bottom portion of the connecting glass run channel, the locking portion formed at the inner wall of the insertion hole is locked to the trunk portion (for example, the opposing face of the trunk portion) of the engaging member. Therefore, the engaging member can be previously prevented from positionally deviating or falling out in a falling-out direction from the base bottom portion of the connecting glass run channel, in response to the deformation of the insertion hole that may occur in a case where the glass run channel assembly including the engaging member is carried.

In a preferred mode of the glass run channel assembly disclosed above (hereinafter referred to as "a first mode"), the locking portion includes a first locking portion that is formed so as to be displaced toward a central axis of the insertion hole when the side wall portion of the connecting glass run channel is displaced in the width direction. The base bottom portion of the connecting glass run channel is configured so that the first locking portion presses the trunk portion and is locked to the trunk portion when the connecting glass run channel to which the engaging member is attached is mounted within the groove formed at the predetermined position of the window frame.

According to the glass run channel assembly of this configuration, when the connecting glass run channel to which the engaging member is attached is mounted on the window frame, the side wall portion of the connecting glass run channel is displaced in the width direction (the direction in which the angle between the base bottom portion and the side wall portion becomes small. The same applies hereinafter). Therefore, a state where the first locking portion (locking portion) is displaced toward the central axis of the insertion hole and the first locking portion (locking portion) is locked to the engaging member (trunk portion) is maintained. Thereby, the engaging member can be effectively prevented from positionally deviating in a falling-out direction or falling out from the connecting glass run channel when the connecting glass run channel is mounted to the window frame.

Further, preferably, the first locking portion is formed at an end portion of the inner wall that configures the periphery of the insertion hole and is located at the inner circumferential side of the base bottom portion.

According to the glass run channel assembly of this configuration, when the side wall portion is displaced in the width direction, the amount of displacement becomes the largest at the end portion of the inner wall that is located on the inner circumferential side of the base bottom portion (that is, the width of the insertion hole becomes the smallest at the end portion of the inner wall located on the inner circumferential side of the base bottom portion). Therefore, as the first locking portion is formed at the end portion located on the inner circumferential side, the first locking portion can more effectively hold the trunk portion of the engaging member.

Further, preferably, a second locking portion, which is locked to a tip side of the trunk portion of the engaging member when the side wall portion of the connecting glass run channel is displaced in the width direction, is formed at an end portion of the inner wall that configures the periphery of the insertion hole and is located on the outer circumferential side of the base bottom portion.

According to the glass run channel assembly of this configuration, as the second locking portion is formed at the end portion of the inner wall located on the outer circumferential side of the base bottom portion, the second locking portion is locked to the tip side of the trunk portion of the engaging member. Thereby, when the connecting glass run channel is mounted on the window frame, the engaging member can be stably locked to the connecting glass run channel.

Further, preferably, the first locking portion is formed in a convex shape that projects toward the central axis of the insertion hole.

According to the glass run channel assembly of this configuration, the convex locking portion is formed in a direction that intersects a direction in which the engaging member is inserted (a direction toward the central axis of the insertion hole). Therefore, when the connecting glass run channel is mounted on the window frame, the engaging member (trunk portion) is favorably pressed by the first locking portion formed in a convex shape. Thereby, the stability of the engaging member with respect to the connecting glass run channel is improved.

Further, preferably, a plurality of the first locking portions are formed at regions of the inner wall configuring the periphery of the insertion hole, the regions of the inner wall facing each other in the width direction.

According to the glass run channel assembly of this configuration, when the connecting glass run channel is mounted on the window frame, the plurality of first locking portions formed in regions that face each other in the width direction are displaced in directions approaching each other and pinches the engaging member (trunk portion). Therefore, the stability of the engaging member with respect to the connecting glass run channel is improved.

Further, preferably, a portion of the base bottom portion peripheral to the insertion hole has a projection portion that projects toward an outer circumferential direction from an outer circumferential surface of the base bottom portion (a surface at a side that faces the engaging portion (window frame component member) when mounted on the window frame. The same applies hereinafter). The projection portion is formed so as to configure a protruding portion, which engages with the engaging portion, along with the trunk portion of the engaging member inserted into the insertion hole.

In the glass run channel assembly of this configuration, the base bottom portion is formed with the projection portion. Therefore, when the connecting glass run channel to which the engaging member is attached is mounted on the window frame, the protruding portion composed of the projection portion and the engaging member can be easily engaged with the engaging portion of the window frame. Additionally, since the engaging member is covered with the projection portion, even in a state where the protruding portion is mounted on the engaging portion, the engaging member and the engaging portion do not come into direct contact with each other, and generation of abnormal noise can be prevented.

Further, preferably, the insertion hole is a through hole that passes through the base bottom portion and the projection portion in inner and outer circumferential directions.

According to the glass run channel assembly of this configuration, the insertion hole passes through. Therefore, the presence/absence or attachment state of the engaging member can be confirmed from the outer circumferential side of the base bottom portion of the connecting glass run channel. For this reason, the engaging member can be more reliably attached to the insertion hole.

Further, preferably, the insertion hole is a non-through hole that opens to the inner circumferential side of the base bottom portion and is closed at the outer circumferential side of the projection portion.

According to the glass run channel assembly of this configuration, the insertion hole does not pass through the outer circumferential side of the projection portion. Therefore, the projection portion is not easily deformed, and deformation of the insertion hole itself can be suppressed.

Further, preferably, an inner circumferential surface of the base bottom portion of the connecting glass run channel (a surface that faces the window pane when mounted on the window frame. The same applies hereinafter) is formed with a base supporting portion that supports the base portion of the engaging member when the trunk portion of the engaging member is inserted into and attached to the insertion hole. The base supporting portion is formed in a concave shape that recesses in the outer circumferential direction further than the inner circumferential surface of the base bottom portion of the connecting glass run channel.

According to the glass run channel assembly of this configuration, as the base portion of the engaging member abuts against the base supporting portion that is formed in a concave shape, positioning of the engaging member becomes easy. For this reason, the engaging member can be easily arranged and fixed at an exact position. Moreover, when the connecting glass run channel to which the engaging member is attached is mounted on the window frame, the base bottom portion pinches the base portion of the engaging member. Therefore, positional deviation or falling-out of the engaging member can be more effectively prevented.

Additionally, as the base portion formed from a material harder than the base bottom portion is arranged at the concave base supporting portion of the base bottom portion, deformation of the base bottom portion can be suppressed.

Moreover, in order to realize the above object, a glass run channel product including the glass run channel assembly of any of those disclosed herein is provided. That is, the glass run channel product of the invention includes the glass run channel assembly according to any of those described above and the above-described engaging member.

Preferably, the trunk portion of the engaging member is formed with a locking concave portion to which the locking portion is locked, and the locking portion is locked to the locking concave portion in a state where the side wall portion of the connecting glass run channel is displaced in the width direction.

According to the glass run channel product of this configuration, the locking portion can be more firmly locked to the trunk portion of the engaging member. Therefore, the stability of the engaging member with respect to the connecting glass run channel is further improved.

Further, in another preferred mode of the glass run channel assembly disclosed above (hereinafter referred to as "a second mode"), the base bottom portion of the connecting glass run channel is provided with a projection portion that projects from an outer circumferential surface, and the projection portion is configured to be engageable with the engaging portion when the connecting glass run channel is mounted on the predetermined position of the window frame. The projection portion is formed so that the engaging member is attachable thereto. An inner circumferential surface of the base bottom portion of the connecting glass run channel is formed with a base supporting portion that supports the base portion of the engaging member when the engaging member is attached. The projection portion and the insertion hole are formed within a range corresponding to the base supporting portion, and the insertion hole is formed from the base bottom portion to the projection portion. A longitudinal-direction inner wall and a width-direction inner wall of the connecting glass run channel that configure the periphery of the insertion hole is formed with a longitudinal-direction locking portion and a width-direction locking portion, which are locked to the trunk portion of the engaging member when the engaging member is inserted into the insertion hole, as the locking portion.

According to the glass run channel assembly of this configuration, the above longitudinal-direction locking portion and the above width-direction locking portion are locked to the trunk portion (for example, every side of the trunk portion) of the engaging member. Therefore, the engaging member can be effectively prevented from positionally deviating in a falling-out direction or falling out from the base bottom portion of the connecting glass run channel.

Preferably, the inner wall that configures the periphery of the insertion hole and is located at the inner circumferential side of the base bottom portion is formed with at least one of the longitudinal-direction locking portion and the width-direction locking portion.

According to the glass run channel assembly of this configuration, the locking portion formed at the inner wall located on the inner circumferential side of the base bottom portion is locked to the base portion side of the engaging member (trunk portion) when the engaging member is inserted into the insertion hole. Therefore, the engaging member can be stably locked to the base bottom portion.

Further, preferably, the inner wall that configures the periphery of the insertion hole and is located on the outer circumferential side of the base bottom portion is formed with at least one of the longitudinal-direction locking portion and the width-direction locking portion.

According to the glass run channel assembly of this configuration, the locking portion formed at the inner wall located on the outer circumferential side of the base bottom portion is locked to the tip side of the engaging member (trunk portion) when the engaging member is inserted into the insertion hole. Therefore, the engaging member can be stably locked to the base bottom portion.

Further, preferably, at least one of the longitudinal-direction locking portion and the width-direction locking portion includes a convex portion that projects toward the central axis of the insertion hole or a concave portion that is recessed in a direction away from the central axis of the insertion hole.

According to the glass run channel assembly of this configuration, when the trunk portion of the engaging member is inserted into the insertion hole, mechanical locking between the engaging member and the base bottom portion of the connecting glass run channel is possible, and the engaging member can be more easily and firmly fixed to the base bottom portion of the connecting glass run channel.

Further, preferably, the concave portion is formed at an end portion of the inner wall that is located on the outer circumferential side of the base bottom portion.

According to the glass run channel assembly of this configuration, the engaging member can be fixed to the base bottom portion of the connecting glass run channel with a simple configuration.

Further, preferably, the insertion hole is a through hole that passes through the base bottom portion and the projection portion in inner and outer circumferential directions.

According to the glass run channel assembly of this configuration, the insertion hole passes through. Therefore, the presence/absence or attachment state of the engaging member can be confirmed from the outer circumferential side of the base bottom portion of the connecting glass run channel. For this reason, the engaging member can be more reliably attached to the insertion hole.

Further, preferably, the insertion hole is a non-through hole that opens to the inner circumferential side of the base bottom portion and is closed at the outer circumferential side of the projection portion.

According to the glass run channel assembly of this configuration, the insertion hole does not pass through the outer circumferential side of the projection portion. Therefore, the projection portion is not easily deformed, and deformation of the insertion hole itself can be suppressed.

Further, preferably, the longitudinal-direction locking portion and the width-direction locking portion are continuously formed in a direction perpendicular to the central axis of the insertion hole.

According to the glass run channel assembly of this configuration, the longitudinal-direction locking portion and the width-direction locking portion are continuously (for example, over the whole periphery of the insertion hole) formed at the inner wall that configures the periphery of the insertion hole. Therefore, locking between the base bottom portion and the engaging member becomes firmer. For this reason, in a case where the connecting glass run channel is deformed, unlocking between the base bottom portion and the engaging member can be more effectively suppressed, and positional deviation and falling-out of the engaging member can be prevented.

Further, preferably, the base supporting portion is formed in a concave shape that retreats in the outer circumferential direction further than the inner circumferential surface of the base bottom portion of the connecting glass run channel.

According to the glass run channel assembly of this configuration, as the base portion of the engaging member abuts against the base supporting portion that is formed in a concave shape, positioning of the engaging member becomes easy. For this reason, the engaging member can be easily arranged and fixed at an exact position. Moreover, when the connecting glass run channel to which the engaging member is attached is mounted on the window frame, the base bottom portion pinches the base portion of the engaging member. Therefore, positional deviation or falling-out of the engaging member can be more effectively prevented.

Additionally, as the base portion formed from a material harder than the base bottom portion is arranged at the concave base supporting portion of the base bottom portion, deformation of the base bottom portion can be suppressed.

Moreover, a glass run channel product including any glass run channel assembly of the second form disclosed here is provided in order to realize the above object. That is, the glass run channel product of the invention is characterized by including any glass run channel assembly of the above-described second form and the above-described engaging member.

Preferably, at least one of the longitudinal-direction locking portion and the width-direction locking portion includes a convex portion that projects toward the central axis of the insertion hole, and the trunk portion of the engaging member is formed with a locking concave portion that is locked to the locking convex portion. The convex portion is locked to the locking concave portion in a state where the engaging member is inserted into the insertion hole.

According to the glass run channel product of this configuration, the locking concave portion of the engaging member and the convex portion of the base bottom portion of the connecting glass run channel are mechanically locked while securing the rigidity of the engaging member. Therefore, the engaging member can be easily and firmly fixed by the base bottom portion of the connecting glass run channel.

Further, preferably, the convex portion is formed at the inner wall that is located at the inner circumferential side of the base bottom portion, and the locking concave portion is formed at a base portion side of the trunk portion.

According to the glass run channel product of this configuration, the base portion side of the trunk portion of the engaging member can be locked (fixed). Thus, the engaging member can be stably locked to the base bottom portion.

Further, preferably, at least one of the longitudinal-direction locking portion and the width-direction locking portion includes a concave portion that is recessed in a direction away from the central axis of the insertion hole, and the trunk portion of the engaging member is formed with a locking convex portion that is locked to the concave portion. The locking convex portion is locked to the concave portion in a state where the engaging member is inserted into the insertion hole.

According to the glass run channel product of this configuration, the locking convex portion of the engaging member and the concave portion of the base bottom portion of the connecting glass run channel are mechanically locked. Therefore, the engaging member can be more easily and firmly fixed to the base bottom portion of the connecting glass run channel. Moreover, by forming the locking convex portion of the trunk portion largely (thickly), the concave portion of the base bottom portion can be more firmly locked even if the projection portion is not made large (thick).

Further, preferably, the concave portion is formed at the inner wall that is located at the outer circumferential side of the base bottom portion, and the locking convex portion is formed at a tip side of the trunk portion.

According to the glass run channel product of this configuration, the tip side of the trunk portion of the engaging member can be locked (fixed). Thus, the engaging member can be stably locked to the base bottom portion even in a case where the outer circumferential side of the base bottom portion of the connecting glass run channel is largely displaced.

DESCRIPTION OF EMBODIMENTS

Figure 1:
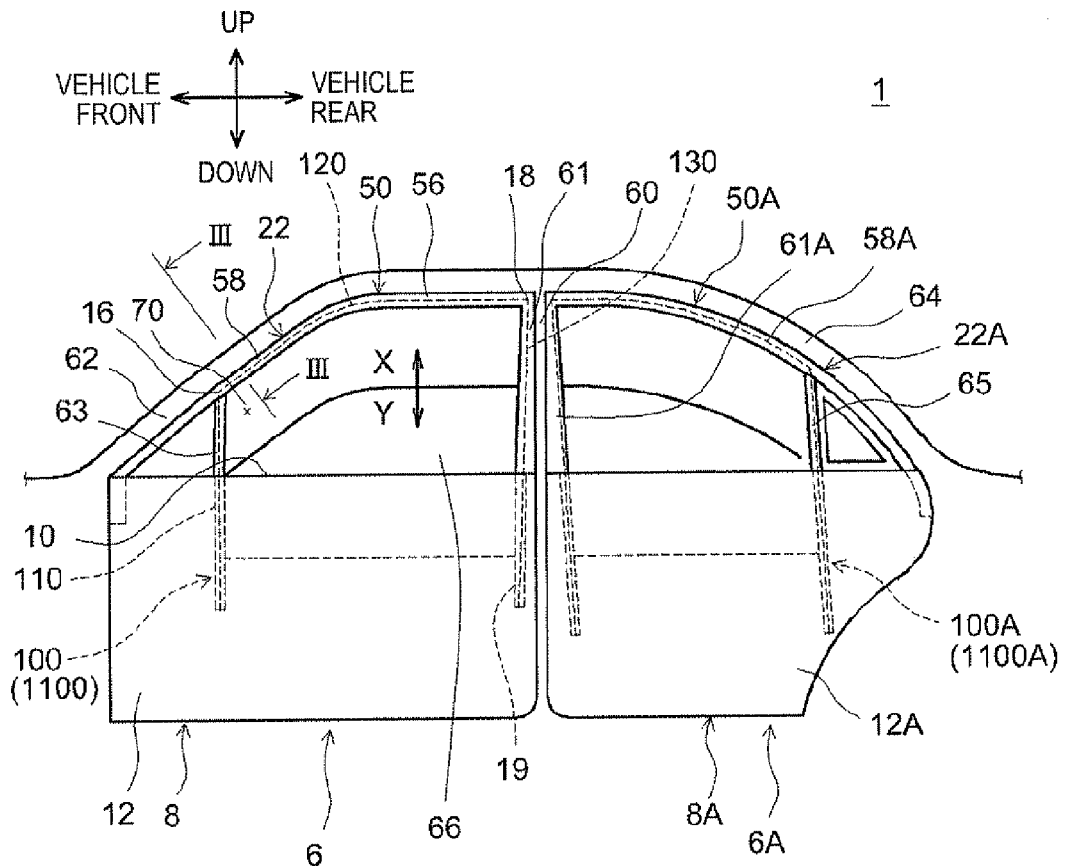
FIG. 1 is a vehicle exterior side view schematically showing left front and rear doors of a car to which a glass run channel assembly related to one embodiment is attached.

Hereinafter, preferred embodiments of the invention will be described. In addition, matters other than matters particularly mentioned in this specification (for example, general matters about manufacture of a glass run channel by extrusion molding or the like), which are required for carrying out the invention, may be understood to be design matters for those skilled in the art based on the conventional art. The invention can be carried out on the basis of the matters disclosed in the specification and drawings, and the technical common sense in the field.

Hereinafter, a preferred embodiment of a glass run channel product (including a glass run channel assembly and an engaging member) of the invention will be described in detail, referring to the drawings.

FIG. 1 is a side view schematically showing a front door 6 and a rear door 6A to be mounted on a car (vehicle) 1. Although only the doors 6 and 6A mounted on the left side face of the car 1 are shown in this drawing, doors and seal units with the same structure (that is, bilaterally symmetrical) are also mounted on the right side face of the car 1. The following description is only about glass run channel products mounted on the front and rear doors 6 and 6A of the left side face that are shown, and duplicate description about glass run channel products mounted on the front and rear doors on the right side face is omitted.

In addition, in the present invention, front and rear indicate the front-and-rear direction of a vehicle, the inner circumferential side (or inner circumferential direction) and the outer circumferential side (or outer circumferential direction) indicate the direction of the center of a window opening, and the direction (direction away from the center of the window opening) of an outer circumferential edge of a window pane, respectively. Additionally, up and down indicate the up-and-down direction in the direction of gravity, the right side and the left side indicate a vehicle right side (driver's seat side) and a vehicle left side (front passenger side), respectively, and the vehicle interior side and the vehicle exterior side indicate a direction approaching the center of the vehicle and a direction away from the center of the vehicle, respectively.

As shown in FIG. 1, the front door 6 has a door outer panel 12 and a door inner panel 14 (refer to FIG. 9) that configures a door body 8, and a door frame (window frame) 22 formed above the door body 8.

Figure 9:
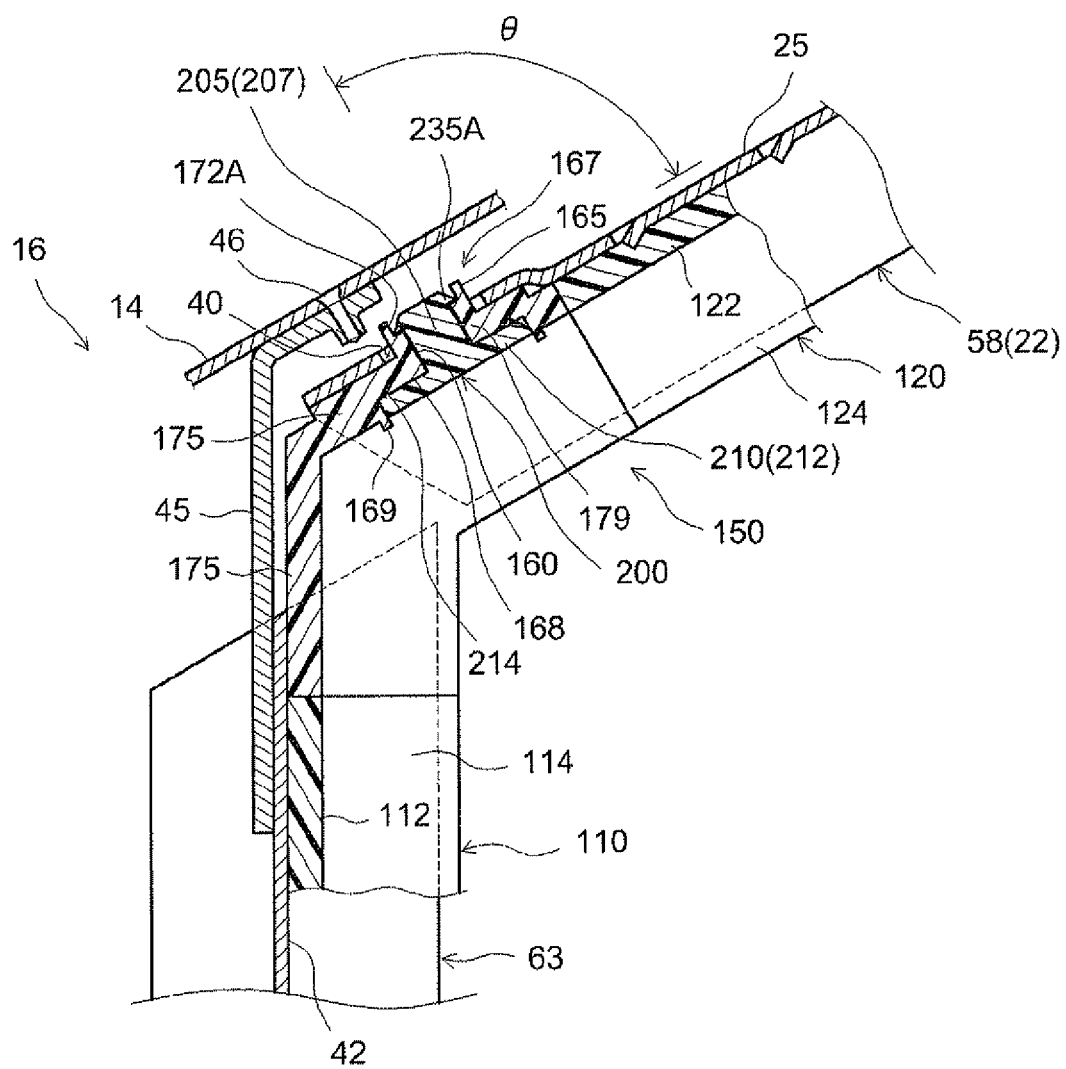
FIG. 9 is a cross-sectional view taken along line IX-IX in FIG. 8.

The door frame 22 has a center-pillar-side vertical side frame 61 that is arranged in the up-and-down direction along the center pillar 60 of the car 1, and an upper side frame 50 (including a horizontal frame 56 and an inclination frame 58) that is integrally joined to an upper end of the center-pillar-side vertical side frame 61 and extends along the front pillar 62 of the car 1. A front-pillar-side vertical side frame 63 (also referred to as "partition frame" or "partition") that extends in a substantially vertical direction (that is, extends parallel to the center-pillar-side vertical side frame 61) is mounted such that the upper end of the front-pillar-side vertical side frame 63 is connected to the region of the inclination frame 58 of the upper side frame 50 slightly nearer to the front. Additionally, a front corner portion 16 is formed so that the front-pillar-side vertical side frame 63 and the inclination frame 58 intersect each other at a predetermined intersection angle, and a rear corner portion 18 is formed so that the center-pillar-side vertical side frame 61 and the horizontal frame 56 intersect each other at a predetermined intersection angle. Here, as shown in FIG. 9, the front corner portion 16 is configured by the end of the inclination frame 58 of the above configuration, and the front-pillar-side vertical side frame 63 that intersects the inclination frame 58 at a predetermined intersection angle. The front-pillar-side vertical side frame 63 is made of a steel material formed to have a substantially H-shaped cross-section. A portion 42 that extends in the vehicle width direction configures a bottom wall portion 42 of the front-pillar-side vertical side frame 63. Additionally, the front-pillar-side vertical side frame 63 is fixed to joint fitting 45 having an L-shaped cross-section by spot welding, or the like. The joint fitting 45 is fastened and fixed to the door inner panel 14 by a screw 46, or the like. This makes it possible to fix the front-pillar-side vertical side frame 63 at a predetermined position.

As shown in FIG. 1, a groove 32 (refer to FIG. 3) in which a glass run channel product 100 (a glass run channel assembly 105 (refer to FIG. 2)) related to a first embodiment to be described below and a glass run channel product 1100 (glass run channel assembly 1105 (refer to FIG. 2)) related to a second embodiment can be mounted is continuously formed at a predetermined position on the inner circumferential side of the door frame 22 (that is, the center-pillar-side vertical side frame 61, the upper side frame 50, the front-pillar-side vertical side frame 63). The glass run channel product 100 (glass run channel product 1100) is mounted within the groove 32 so as to follow the shape of the groove 32, and configures a window frame structure. In addition, in the following description, portions common to the glass run channel product 100 and the glass run channel product 1100 will be described taking the glass run channel product 100 as an example.

Additionally, a window opening portion 70 is formed by a door body upper edge 10, the center-pillar-side vertical side frame 61, the upper side frame 50, and the front-pillar-side vertical side frame 63. A window pane 66 is mounted in the window opening portion 70 so as to be capable of moving up and down. The window pane 66 is attached to a window pane lifting/lowering mechanism (not shown) that is provided inside the door body 8. The peripheral edge of the window pane 66 is guided by the glass run channel product 100 (glass run channel assembly 105) when moving up and down (when moving in the directions of arrows X and Y of FIG. 1).

Similarly, the rear door 6A has a door outer panel 12A and a door inner panel (not shown) of a door body 8A, and a door frame (window frame) 22A formed above the door body 8A.

The door frame 22A has a center-pillar-side vertical side frame 61A, and an upper side frame 50A integrally joined to an upper end of the center-pillar-side vertical side frame 61A. The upper side frame 50A has an inclination frame 58A that extends obliquely downward while being curved along a rear pillar 64 from the upper end of the center-pillar-side vertical side frame 61A. Additionally, the door frame 22A has a rear-pillar-side vertical side frame 65. The glass run channel product 100A is mounted on the door frame 22A, similar to the case of the front door 6.

Figure 2:
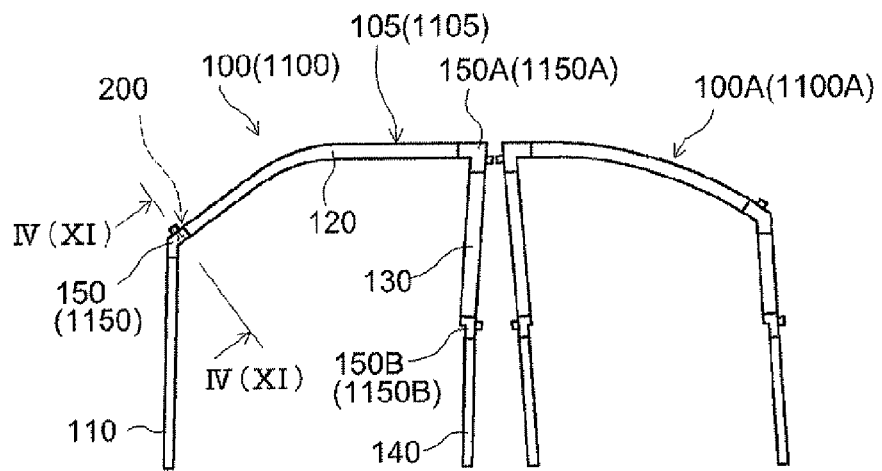
FIG. 2 is a side view schematically showing the entire structure of the glass run channel assembly related to one embodiment.

FIG. 2 is a side view schematically showing the glass run channel products 100 and 100A related to the first embodiment and the glass run channel products 1100 and 1100A related to the second embodiment, which are mounted within the grooves formed at a predetermined position of the door frame 22 of the front door 6 and at a predetermined position of the door frame 22A of the rear door GA, respectively. As shown in FIGS. 1 and 2, there is a slight difference in size or the like depending on a difference in the shape of the front door 6 and the rear door 6A, that is, a difference in the shape of the front and rear door frames 22 and 22A. However, the glass run channel product 100 mounted on the front door 6 and the glass run channel product 100A mounted on the rear door 6A are almost the same, and there is no difference in the configuration that characterizes the invention. Accordingly, the following description is given about the glass run channel product 100 for the front door 6 and the door frame 22, and the description about the glass run channel product 100A for the rear door 6A and the door frame 22A is omitted due to duplication.

As shown in FIG. 2, the glass run channel product 100 related to the first embodiment includes a glass run channel assembly 105 and an engaging member 200. First, the glass run channel assembly 105 that configures the glass run channel product 100 will be described.

As shown in FIG. 2, the glass run channel assembly 105 related to the first embodiment includes a first elongated glass run channel 110 mounted along the front-pillar-side vertical side frame 63, a second elongated glass run channel 120 mounted along the upper side frame 50, a third elongated glass run channel 130 mounted along the center-pillar-side vertical side frame 61, and a fourth elongated glass run channel 140 mounted along a separate lower sash 19 (refer to FIG. 1) equipped to the door outer panel 12.

Moreover, the glass run channel assembly 105 related to the first embodiment includes a total of three connecting glass run channels 150, 150A and 150B in addition to the first to fourth elongated glass run channels 110, 120, 130, and 140. That is, the glass run channel assembly 105 related to the first embodiment includes the connecting glass run channels 150, 150A, and 150B that integrally connects longitudinal facing terminals of the first and second above glass run channels 110 and 120, longitudinal facing terminals of the second and third glass run channels 120 and 130, and longitudinal facing terminals of the third and fourth glass run channels 130 and 140, respectively.

The above first to fourth elongated glass run channels 110, 120, 130, and 140 are respectively formed in a predetermined cross-sectional shape from a predetermined elastic polymeric material by extrusion molding. Preferable elastic polymeric materials include an elastic rubber (typically, a material consisting mainly of ethylene propylene diene rubber (EPDM)) hardened by vulcanization, olefin-based thermoplastic elastomer (TPO), styrene-based thermoplastic elastomer (TPS), and the like.

On the other hand, the connecting glass run channels 150, 150A and 150B are formed so as to connect terminals of adjacent glass run channels together by an injection molding (insert injection molding) using a predetermined elastic polymeric material between the terminals. Preferable elastic polymeric materials include elastic rubber (typically, a material consisting mainly of EPDM rubber) hardened by vulcanization, TPO, or the like. When injection molding is performed between facing terminals of adjacent glass run channel, it is preferable to have compatibility with an elastic polymeric material that forms the adjacent glass run channels and be capable of being chemically joined so as to be suitably connected with the terminals.

Figure 3:
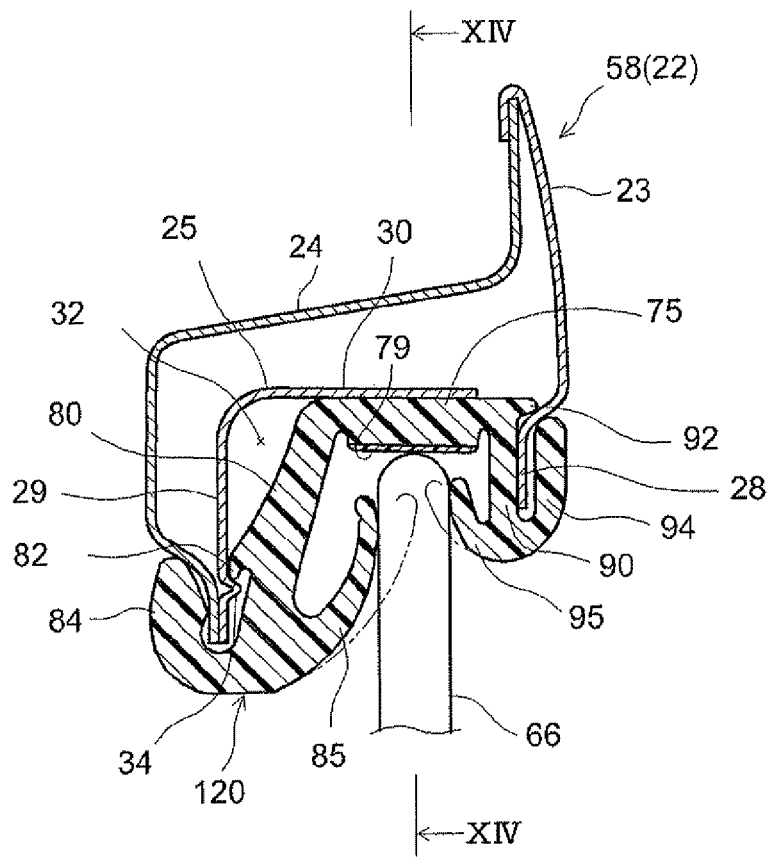
FIG. 3 is a cross-sectional view taken along line III-III in FIG. 1, schematically showing the structure of a glass run channel.

Next, the cross-sectional shape and attachment form of the first to fourth elongated glass run channels that configure the glass run channel assembly 105 related to the first embodiment will be simply described. FIG. 3 is a cross-sectional view taken along line III-III in FIG. 1. With reference to this drawing, the cross-section structure of the second elongated glass run channel 120 related to the first embodiment and the relevant region of a member that configure the window frame 22 (here, inclination frame 58) will be described. In addition, since the other first, third, fourth elongated glass run channels 110, 130, and 140 also have almost the same structure, redundant description is omitted.

As shown in FIG. 3, the inclination frame 58 (window frame 22) is adapted so that a vehicle exterior door frame 23 and a vehicle interior door frame 24 that are formed so as to extend upward of the vehicle from the door outer panel 12 (refer to FIG. 1) and the door inner panel 14 (refer to FIG. 9), respectively, are bent in a predetermined form and thereby engaged with each other. Additionally, a stopper 25 having an L-shaped cross-section as a window frame component member is joined to the vehicle interior door frame 24 by spot welding, or the like.

In the inclination frame 58 having this configuration, the groove 32 is formed by a vehicle exterior side wall 28 composed of the vehicle exterior door frame 23, and a vehicle interior side wall 29 and a bottom wall 30 composed of the stopper 25. In addition, a protrusion 34 is formed along the longitudinal direction in a portion of the surface of the vehicle interior side wall 29 on the side of the groove 32.

Figure 4:
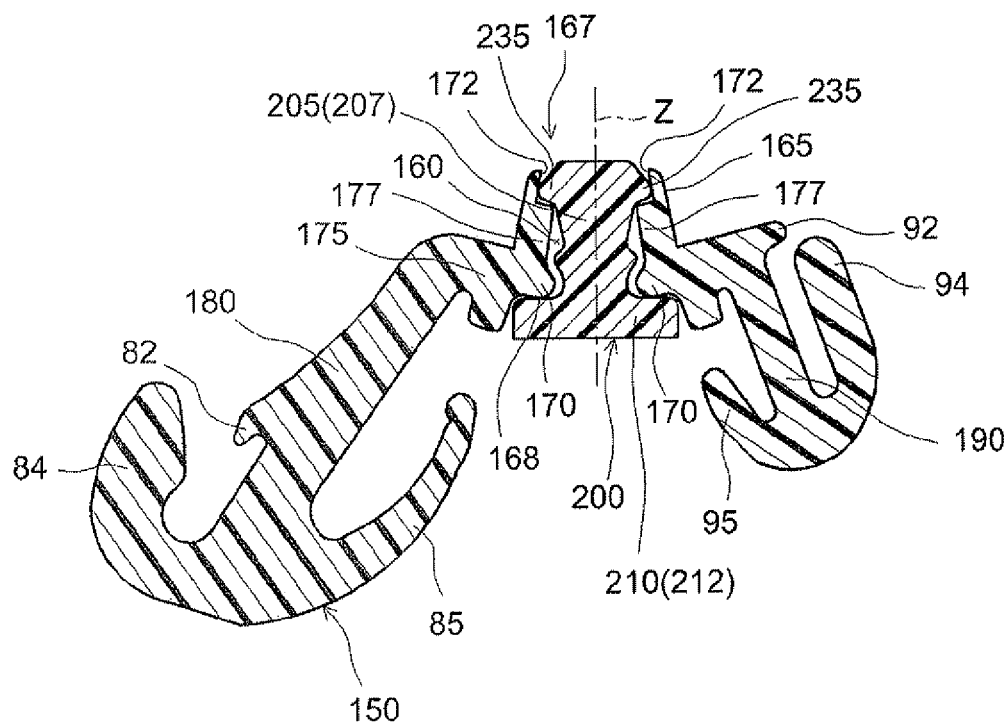
FIG. 4 is a cross-sectional view taken along line IV-IV in FIG. 2, schematically showing the structure of a connecting glass run channel.

On the other hand, as shown in FIG. 3, the glass run channel (here, the second glass run channel 120) related to the first embodiment has a substantially U-shaped constant cross-sectional shape that is molded in an elongated shape by extrusion molding of the above polymer material. In addition, the glass run channel is formed in the shape of an expanded letter U as shown in FIG. 4 before being mounted in the groove 32.

Additionally, the glass run channel 120 has a base bottom portion 75 that is arranged at a position that faces the end face of the up and down moving window pane 66 that is guided to the window frame 22 and moves up and down, and a vehicle interior side wall portion 80 and a vehicle exterior side wall portion 90 that project integrally toward an inner circumferential side at predetermined intersection angles with respect to the base bottom portion 75 from both ends of the base bottom portion 75 in the width direction. A low friction layer 79 having a lower coefficient of static friction than the base bottom portion 75 is continuously formed in the longitudinal direction on the surface of the base bottom portion 75. This makes it possible to prevent the positional deviation of the glass run channel 120 even when the up and down moving window pane 66 repeatedly strikes the base bottom portion 75 (low friction layer 79).

Moreover, as shown in FIG. 3, the glass run channel 120 has a vehicle interior seal lip 85 and a vehicle exterior seal lip 95. The vehicle interior seal lip 85 and the vehicle exterior seal lip 95 project integrally toward the center side of the base bottom portion 75 in the width direction from respective protruding tips of the vehicle interior side wall portion 80 and the vehicle exterior side wall portion 90. The vehicle interior seal lip 85 and the vehicle exterior seal lip 95 extend in a folded shape while holding a space between the vehicle interior side wall portion 80 and the vehicle exterior side wall portion 90. The vehicle interior seal lip 85 and the vehicle exterior seal lip 95 are capable of coming into elastic contact with the side faces of the up and down moving window pane 66.

Additionally, a vehicle interior locking protrusion 82 and a vehicle interior folded lip 84 are formed at the glass run channel 120 so as to overhang outward (vehicle interior) from the vehicle interior side wall portion 80. Similarly, a vehicle exterior locking protrusion 92 and a vehicle exterior folded lip 94 are formed so as to overhang outward (vehicle exterior) from the vehicle exterior side wall portion 90. This prevents falling-out from the groove 32 in a state where the glass run channel 120 is mounted within the groove 32 of the inclination frame 58 (window frame 22). In addition, since the structure of the above second glass run channel 120 (and other first, third, and fourth elongated glass run channels 110, 130, and 140) itself is not particularly a substantial portion of the invention, the description of the further detailed structure is omitted.

Hereinafter, the connecting glass run channel 150 that characterizes the glass run channel assembly 105 related to the first embodiment will be described in detail. In addition, although the glass run channel assembly 105 related to the present embodiment includes a total of three connecting glass run channels 150, 150A and 150B, since the characteristic portions of the invention are common, the connecting glass run channel 150 that integrally connects the longitudinal terminals of the first and second glass run channels 110 and 120 will be described below, referring to the drawings.

In addition, accessory portions (the folded lips 84 and 94, the seal lips 85 and 95, and the like) formed in a vehicle interior side wall portion 180 and a vehicle exterior side wall portion 190 in the cross-sectional shape of the connecting glass run channel 150 related to the first embodiment have substantially the same shapes as those formed in the above second elongated glass run channel 120 shown in FIG. 3. Therefore, substantially the same members or mechanisms are designated by the same reference numerals, and further detailed description thereof is omitted.

FIG. 4 is a cross-sectional view taken along line IV-IV in FIG. 2, schematically showing the structure of the connecting glass run channel 150. As shown in FIG. 4, a base bottom portion 175 of the connecting glass run channel 150 is formed with an insertion hole 160 to which an engaging member 200 to be described below can be attached. A portion of the base bottom portion 175 that is a peripheral portion of the above insertion hole 160 has a projection portion 165 that projects toward the outer circumferential direction from the outer circumferential surface of the base bottom portion 175. In the present embodiment, the insertion hole 160 is a through hole that passes through the base bottom portion 175 and the projection portion 165 in the inner and outer circumferential directions. Here, the projection portion 165 is formed so as to configure a protruding portion 167 that is engageable with an engagement hole 40 serving as an engaging portion (to be described below) that is provided within the groove 32 of the window frame 22 (inclination frame 58), together with a trunk portion 205 of the engaging member 200 attached to the insertion hole 160.

Locking convex portions 170, 170 that are first locking portions (locking portions) are formed in the regions that face each other in the width direction of the base bottom portion 175, at end portions of lateral inner walls 177, 177 (inner walls formed along the longitudinal direction of the base bottom portion 175) that are inner walls that configure the periphery of the insertion hole 160 and are located on the inner circumferential side of the base bottom portion 175. The locking convex portions 170 are formed in a convex shape that projects toward the central axis Z of the insertion hole 160. The locking convex portions 170 are formed so as to be displaced toward the central axis Z of the insertion hole 160 (that is, so that the locking convex portions 170, 170 approach each other) when the vehicle interior side wall portion 180 and the vehicle exterior side wall portion 190 of the connecting glass run channel 150 are displaced in the width direction (displaced in the direction in which the respective side wall portions 180 and 190 approach each other). The locking convex portions 170 are formed in such a shape that the locking convex portion 170 can fit into locking concave portions 224 (to be described below) of the engaging member 200, and press and lock the trunk portion 205.

On the other hand, locking step portions 172, 172 that are second locking portions are formed in the regions that face each other in the width direction of the base bottom portion 175, at end portions (end portions of the projection portion 165 in the present embodiment) of the lateral inner walls 177, 177 that are inner walls that configure the periphery of the insertion hole 160 and are located on the outer circumferential side of the base bottom portion 175. The locking step portions 172 are formed in a stepped shape (concave shape) that is recessed in a direction away from the central axis Z of the insertion hole 160. The locking convex portions 170 are formed so that second locking ridge portions 235 (to be described below) formed on the tip side of the trunk portion 205 of the engaging member 200 can be locked thereto when the vehicle interior side wall portion 180 and the vehicle exterior side wall portion 190 of the connecting glass run channel 150 are displaced in the width direction.

In addition, the locking convex portions 170 and the locking step portions 172 related to the present embodiment are continuously formed in the direction perpendicular to the central axis Z of the insertion hole 160 (continuously formed along the longitudinal direction of the base bottom portion 175 in the lateral inner walls 177). However, a plurality of locking convex portions and a plurality of locking step portions may be formed in a plurality of regions that face each other in the width direction of the base bottom portion 175. Further, a locking convex portion and a locking step portion may be formed in any one of the vehicle interior and vehicle exterior lateral inner walls. Moreover, although the stepped locking step portions 172 and stepped locking step portions 172A (second locking portion) assume an annular stepped shape continuous with one another, these portions may not be continuous, or may have a level difference of mutually different depths.

Additionally, an inner circumferential surface of the base bottom portion 175 is formed with a base supporting portion 168 that supports a base portion 210 of the engaging member 200 when the trunk portion 205 of the engaging member 200 is inserted into and attached to the insertion hole 160. The base supporting portion 168 is formed in a concave shape that recesses in the outer circumferential direction further than the inner circumferential surface of the base bottom portion 175. The base supporting portion 168 is formed in a shape corresponding to the outer shape of the base portion 210 and is adapted so as to abut against and support at least a portion of the peripheral edge of the base portion 210.

In addition, the shapes of the insertion hole 160 and the projection portion 165 are not particularly limited, and the cross-sectional shapes thereof may be a circular hole, an ellipse, or the like other than a quadrangular shape.

Figure 7:
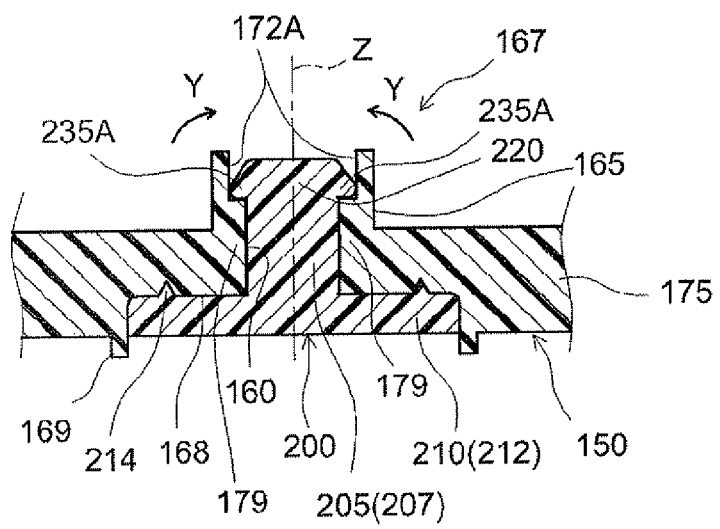
FIG. 7 is a cross-sectional view taken along line VII-VII in FIG. 6.

As shown in FIGS. 4 and 7, the periphery of the insertion hole 160 is surrounded in a tubular shape by the lateral inner walls 177 and lengthwise inner walls 179, and the portions of the lateral inner walls 177 and the lengthwise inner walls 179 that project from the outer surface of the base bottom portion 175 to the outer circumferential side form the projection portion 165.

Additionally, the lateral inner walls 177 are formed in a plate shape along the longitudinal direction of the base bottom portion 175 of the connecting glass run channel 150. In the present embodiment, a pair of lateral inner walls 177, 177 is arranged at a predetermined interval in the width direction (horizontal direction) of the base bottom portion 175.

Additionally, the lengthwise inner walls 179 are formed in a plate shape along the width direction of the base bottom portion 175 of the connecting glass run channel 150. In the present embodiment, a pair of lengthwise inner walls 179 and 179 is arranged at a predetermined interval in the longitudinal direction (lengthwise direction) of the base bottom portion 175.

Figure 5:
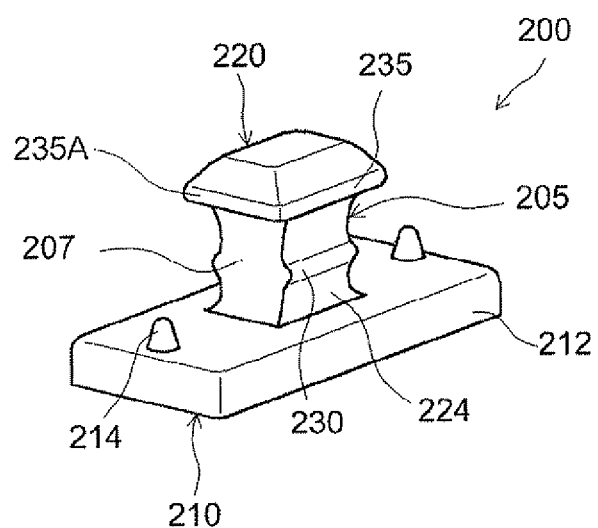
FIG. 5 is a perspective view schematically showing the structure of an engaging member related to one embodiment.

Next, the engaging member 200 that configures the glass run channel product 1.00 related to the present embodiment and is attached to (inserted into) the insertion hole will be described referring to the drawings. FIG. 5 is a perspective view schematically showing the structure of the engaging member 200 related to the present embodiment.

The engaging member 200 related to the present embodiment is a member that is formed in advance separately from the connecting glass run channel 150. The engaging member 200 is a molded article that is molded from synthetic resin materials that are harder and more rigid than the elastic polymeric material that molds the connecting glass run channel 150, for example, elastic polymeric materials, such polyacetal (POM) and nylon (polyamide-based resin). In addition, the engaging member 200 may be a press-formed article, a cast article, a forged article, or the like of a metallic material. Additionally, the engaging member 200, as shown in FIG. 5, has the flat-plate-like base portion 210, and the trunk portion 205 that projects (rises) in a direction away from the base portion 210.

A flat-plate-like body portion 212 of the base portion 210 is molded with a size and shape such that the body portion can fit into the above base supporting portion 168. The flat-plate-like body portion 212 has a plurality of positional deviation preventing projections 214 on the surface that faces the base bottom portion 175 when the engaging member 200 is attached to the connecting glass run channel 150. On the other hand, the trunk portion 205 is formed so as to be capable of being inserted into the insertion hole 160 when the engaging member 200 is attached to the connecting glass run channel 150. The trunk portion 205 is formed so as to be engageable with the engagement hole 40 serving as an engaging portion provided within the groove 32 of the window frame 22 (inclination frame 58). In addition, in the present embodiment, the protruding portion 167 composed of the trunk portion 205 and the projection portion 165 engages with the engagement hole 40. In this case, since the trunk portion 205 is covered with the projection portion 165, even in a state where the engagement hole 40 is engaged with the protruding portion 167, the trunk portion 205 does not come into direct contact with the peripheral edge of the engagement hole 40, and generation of abnormal noise can be prevented. Additionally, in a case where the projection portion 165 is not formed on the base bottom portion 175, the trunk portion 205 can be molded so that the trunk portion 205 engages with the engagement hole 40.

The trunk portion 205 has a columnar body portion 207 of such a size that the trunk portion can be inserted into the insertion hole 160, and a locking head 220 that overhangs from the tip of the columnar body portion 207. Locking concave portions 224, to which the locking convex portions 170 formed at the end portions of the lateral inner walls 177 (that is, inner circumferential end portions of the lateral inner walls 177) located on the inner circumferential side of the above base bottom portion 175 when the engaging member 200 is attached to the connecting glass run channel 150 can be locked, are formed on the base portion 210 side of the columnar body portion 207. Moreover, first locking ridge portions 230 that are locked to the lateral inner walls 177 among the inner walls that configure the periphery of the insertion hole 160 are formed in the vicinity of the center of the columnar body portion 207 in the protruding direction (rising direction). Additionally, the locking head 220 is set to be larger than the outer shape of the columnar body portion 207, and includes second locking ridge portions 235 that are locked to the locking step portions 172 formed at the end portions of the lateral inner walls 177 (that is, outer circumferential end portions of the lateral inner walls 177) located on the outer circumferential side of the above base bottom portion 175, and second locking ridge portions 235A that are locked to the locking step portions 172A (refer to FIG. 7) formed at the end portions of the lengthwise inner walls 179 (that is, outer circumferential end portions of the lengthwise inner walls 179) (refer to FIG. 7) located on the outer circumferential side of the base bottom portion 175.

Next, the functions (actions and effects) of the connecting glass run channel 150 when the connecting glass run channel 150 to which the engaging member 200 is attached is mounted within the groove 32 formed at a predetermined position of the window frame 22 (inclination frame 58) will be described in detail, referring to the drawings.

Figure 6:
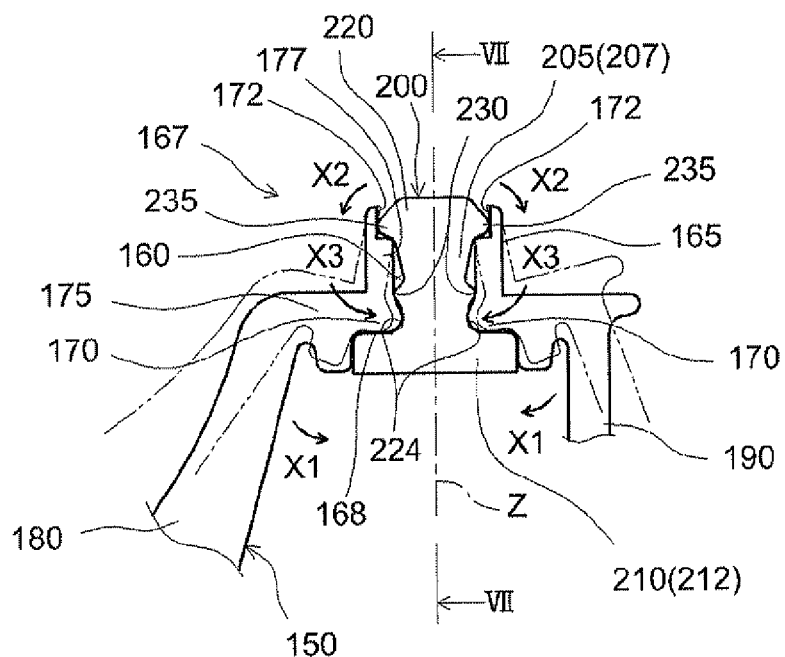
FIG. 6 is an enlarged view of main parts showing a state where a side wall portion of the connecting glass run channel related to one embodiment is displaced in the width direction.

FIG. 6 is an enlarged view of main parts showing a state where the side wall portions 180 and 190 of the connecting glass run channel 150 is displaced in the width direction. FIG. 7 is a cross-sectional view taken along line VII-VII in FIG. 6.

The engaging member 200 is attached to a predetermined position of the connecting glass run channel 150 by inserting the trunk portion 205 into the insertion hole 160 and fitting the base portion 210 into the base supporting portion 168. At this time, the second locking ridge portions 235, 235 of the locking head 220 are locked to the locking step portions (second locking portions) 172, 172 formed at the end portions of the projection portion 165. On the other hand, the locking convex portions (first locking portions) 170, 170 of the connecting glass run channel 150 abut against the locking concave portions 224, 224 of the engaging member 200. However, the locking convex portions are in a state where the locking convex portions do not fit into the concave portions 224, 224 and are not locked to the trunk portion 205 or in a state where the locking convex portions are caught so as not to fall out.

When the connecting glass run channel 150 to which the engaging member 200 is attached is mounted within the groove 32 of the window frame 22, the vehicle interior side wall portion 180 and the vehicle exterior side wall portion 190 are displaced in the width direction (the direction of arrow X1 of FIG. 6) of the base bottom portion 175. Thus, if the side wall portions 180 and 190 are displaced in the width direction, a force that curves the base bottom portion 175 so as to become convex toward the outer circumferential side acts on the base bottom portion 175. Thereby, the end portions of the lateral inner walls 177 that configure the periphery of the insertion hole 160 and are located on the outer circumferential side of the base bottom portion 175 (the outer circumferential end portions of the projection portion 165 in the present embodiment) are displaced in a direction (the direction of arrow X2 of FIG. 6) away from each other (that is, the locking step portions 172, 172 are separated from each other). Additionally, the end portions (that is, the inner circumferential end portions of the lateral inner walls 177) of the lateral inner walls 177 (inner walls) that configure the periphery of the insertion hole 160 and are located on the inner circumferential side of the base bottom portion 175 are displaced in directions approaching each other (the direction of arrow X3 of FIG. 6). As the inner circumferential end portions of the lateral inner walls 177 are displaced in directions approaching each other, the locking convex portions 170, 170 formed in the regions are also displaced in directions approaching each other (the direction toward the central axis Z of the insertion hole 160). The locking convex portions 170, 170 fit into the locking concave portions 224, 224 so as to pinch the trunk portion 205 formed at the trunk portion 205 and are locked to the trunk portion 205. On the other hand, even if the base bottom portion 175 is deformed as mentioned above, it is preferable to maintain a state where the second locking ridge portions 235, 235 be locked to the locking step portions 172, 172. In addition, the first locking ridge portions 230 of the trunk portion 205 abut against and are locked to the lateral inner walls 177 that configure the periphery of the insertion hole 160.

Additionally, as the body portion 212 of the base portion 210 is pinched by the base bottom portion 175 and the positional deviation preventing projections 214 formed on the base portion 210 contact and bite into the inner wall of the base supporting portion 168 (preferably, bite such that a portion of the base bottom portion 175 is deformed), positional deviation of the engaging member 200 is prevented (refer to FIG. 7).

As described above, when the connecting glass run channel 150 is mounted on the inclination frame 58, the engaging member 200 can be prevented from positionally deviating or falling out in a falling-out direction from the connecting glass run channel 150.

On the other hand, as shown in FIG. 7, it is preferable that the locking step portions 172A, 172A that are second locking portions are formed in the regions that face each other in the longitudinal direction of the base bottom portion 175, at the end portions of the lengthwise inner walls 179 that are inner walls that configure the periphery of the insertion hole 160 and are located on the outer circumferential side of the base bottom portion 175. According to this configuration, when the vehicle interior side wall portion 180 and the vehicle exterior side wall portion 190 of the connecting glass run channel 150 are displaced in the width direction, the lengthwise inner walls 179 located on the outer circumferential side of the base bottom portion 175 are displaced in directions approaching each other (the direction of arrow Y of FIG. 7). Thereby, the locking step portions 172A, 172A formed at the outer circumferential end portions of the lengthwise inner walls 179 are displaced in directions approaching each other (the direction toward the central axis Z of the insertion hole 160). For this reason, the second locking ridge portions 235A and 235A are reliably locked by the locking step portions 172A, 172A, so that the above problem can be prevented even in the longitudinal direction of the base bottom portion 175. In addition, a collision preventing ridge 169 that prevents the window pane 66 from colliding with the engaging member 200 is formed in the vicinity of the base supporting portion 168 on the inner circumferential surface of the base bottom portion 175.

Next, a state where the connecting glass run channel 150 to which the engaging member 200 is attached related to the present embodiment is mounted within the groove 32 formed at a predetermined position of the window frame 22 (inclination frame 58) will be described in detail, referring to the drawings.

Figure 8:
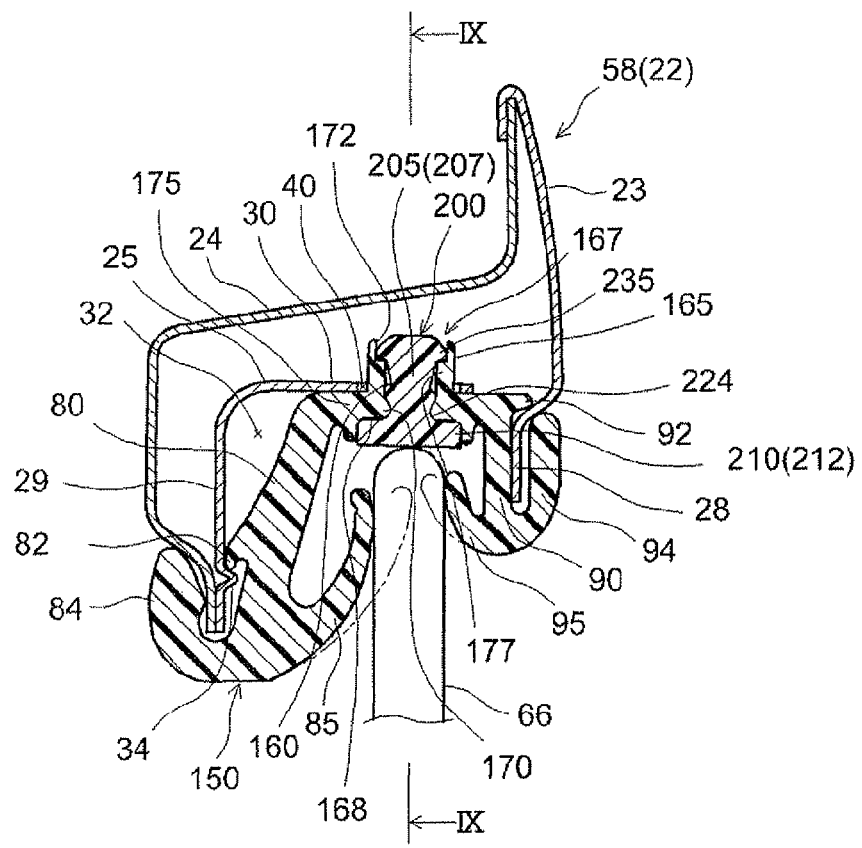
FIG. 8 is a cross-sectional view showing a state where the connecting glass run channel to which the engaging member related to one embodiment is mounted on a window frame.

FIG. 8 is a cross-sectional view showing a state where the connecting glass run channel 150 to which the engaging member 200 related to one embodiment is mounted on the inclination frame 58. FIG. 9 is a cross-sectional view taken along line IX-IX in FIG. 8.

As shown in FIGS. 8 and 9, the engagement hole 40 serving as an engaging portion is formed in the region corresponding to the protruding portion 167, of the above stopper 25 that is a window frame component member. The engagement hole 40 has a size such that the above protruding portion 167 can be inserted (passed) therethrough.

As shown in FIG. 8, in a state where the protruding portion 167 is inserted through the engagement hole 40, and the connecting glass run channel 150 to which the engaging member 200 is attached is mounted on the inclination frame 58 (window frame 22), the locking convex portions 170 fit into the locking concave portions 224 of the trunk portion 205 and are locked to the trunk portion 205, and the second locking ridge portions 235 of the engaging member 200 are locked to the locking step portions 172. Additionally, as the base portion 210 formed from a material harder than the base bottom portion 175 is arranged at the concave base supporting portion 168 of the base bottom portion 175 as in the present embodiment, deformation of the base bottom portion 175 can be suppressed. For this reason, the positional deviation or falling-out of the engaging member 200 from the connecting glass run channel 150 can be prevented. In addition, in the engaging member 200 related to the present embodiment, the trunk portion 205 is formed with the second locking ridge portions 235. However, since the locking convex portions 170 fit into and pinch the locking concave portions 224 even in the trunk portion without such ridge portions 235, the stability of the engaging member 200 with respect to the connecting glass run channel is guaranteed.

Additionally, as shown in FIG. 9, in a case where the force to move (positional deviation) the connecting glass run channel 150 mounted on the inclination frame 58 in the longitudinal direction (particularly, a certain direction of the horizontal frame 56 or the center-pillar-side vertical side frame 61) along the inclination frame 58 is exerted on the connecting glass run channel, the outer wall face of the protruding portion 167, that is, in the present embodiment, the outer wall face of the projection portion 165 abuts against the peripheral edge of the engagement hole 40. Since the mechanical strength of the protruding portion 167 is reinforced by the trunk portion 205 of the engaging member 200 that is fixed within the insertion hole 160, movement of the connecting glass run channel 150 is regulated by this abutment. Therefore, positional deviation in the longitudinal direction can be prevented. Here, although the intersection angle θ between the rising direction of the projection portion 165 of the present embodiment and the stopper 25 is perpendicular, it is preferable to determine the rising direction of the projection portion 165 (that is, determine the formation direction of the insertion hole 160) so that the intersection angle θ becomes an acute angle. By setting the intersection angle θ to an acute angle, the connecting glass run channel 150 can be prevented from falling out of the stopper 25 during use.

In addition, reference numeral 112 in FIG. 9 represents a base bottom portion of a first glass run channel, reference numeral 114 represents a vehicle interior side wall portion of the first glass run channel, reference numeral 122 represents a base bottom portion of a second glass run channel, and reference numeral 124 represents a vehicle interior side wall portion of the second glass run channel.

As described above, when the connecting glass run channel 150 to which the engaging member 200 related to the present embodiment is attached is mounted within the groove 32 formed in the window frame 22 (inclination frame 58), since the locking convex portions 170, 170 pinch the trunk portion 205 of the engaging member 200, the engaging member 200 can be prevented from recessing to the inner circumferential side (positional deviation in a falling-out direction from an insertion direction into the insertion hole 160) or from falling out of the connecting glass run channel 150.

Additionally, in the connecting glass run channel 150 related to the present embodiment having a configuration in which such an engaging member 200 is attached, a separate member that is molded in advance is used as a hard engaging member 200. Thereby, unlike the configuration in which the projection is integrally molded by an injection molding method within a molding die into which an insert member is inserted as in the above conventional art example, the protruding portion 167 that has excellent mechanical strength can be formed by virtue of the easy operation of mounting the engaging member 200 at a predetermined position of the connecting glass run channel 150. Also, since the engaging member 200 may be attached to the base bottom portion 175 that configures the main body of the connecting glass run channel 150 afterward, constraints on the material and shape that configure the engaging member 200 can also be reduced.

Figure 10:
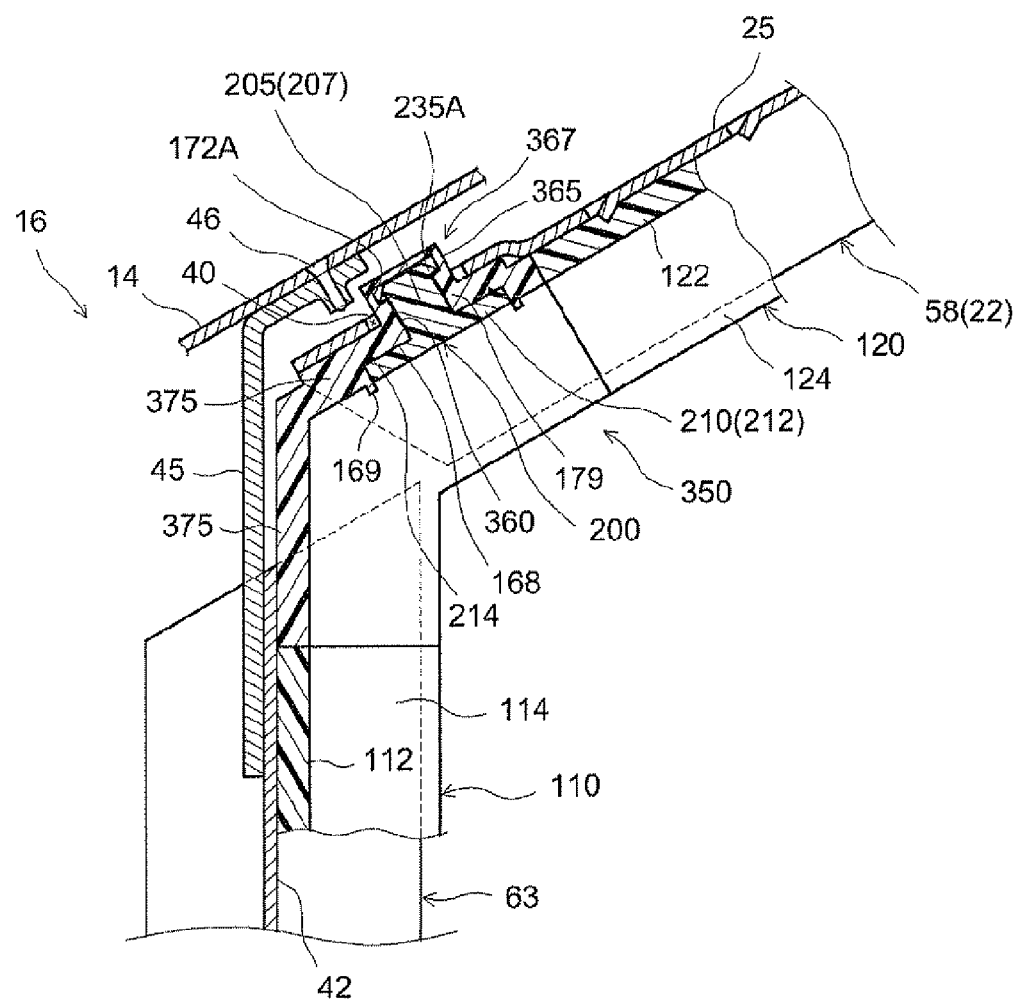
FIG. 10 is a cross-sectional view schematically showing the structure and mounting state of the connecting glass run channel related to one modification.

The shape of the projection portion is not limited to that of the above embodiment. For example, modifications as will be described below are given. FIG. 10 is a cross-sectional view schematically showing the structure and mounting state of a connecting glass run channel 350 related to a first modification of the first embodiment.

As shown in FIG. 10, a base bottom portion 375 of the connecting glass run channel 350 is formed with an insertion hole 360 to which the engaging member 200 can be attached. A portion of the base bottom portion 375 peripheral to the above insertion hole 360 has a projection portion 365 that projects toward the outer circumferential direction from the outer circumferential surface of the base bottom portion 375. In the present modification, the insertion hole 360 is a non-through hole that opens to the inner circumferential side of the base bottom portion 375 and is closed at the outer circumferential side of the projection portion 365. Here, the projection portion 365 is formed so as to configure a protruding portion 367 that is engageable with the engagement hole 40 of the window frame 22 (inclination frame 58), along with the trunk portion 205 of the engaging member 200 attached to the insertion hole 360.

Through this configuration, in addition to the same effects as the case of the first embodiment, the projection portion 365 is not easily deformed and deformation of the insertion hole 360 can be suppressed because the insertion hole 360 does not pass through the projection portion. Moreover, since the insertion hole 360 does not pass through the projection portion 365, waterdrops can be prevented from entering the groove of the connecting glass run channel 350 from the periphery of the engaging member 200.

The invention has been described above in detail particularly regarding the connecting glass run channel 150 that characterizes the glass run channel assembly 105 related to the first embodiment. Next, a connecting glass run channel 1150 that characterizes a glass run channel assembly 1105 related to a second embodiment will be described in detail. In addition, although the glass run channel assembly 1105 related to the present embodiment, as shown in FIG. 2, includes a total of three connecting glass run channels 1150, 1150A and 1150B, since the characteristic portions of the invention are common, the connecting glass run channel 1150 that integrally connects the longitudinal terminals of the first and second glass run channels 110 and 120 will be described below, referring to the drawings.

In addition, since accessory portions (the folded lips 84 and 94, the seal lips 85 and 95, and the like) formed in a vehicle interior side wall portion 1152 and a vehicle exterior side wall portion 1154 in the cross-sectional shape of the connecting glass run channel 1150 related to the present embodiment have substantially the same shapes as those formed in the above second elongated glass run channel 120 shown in FIG. 3, members or mechanisms which are substantially the same are designated by the same reference numerals, and further detailed description thereof is omitted.

Figure 11:
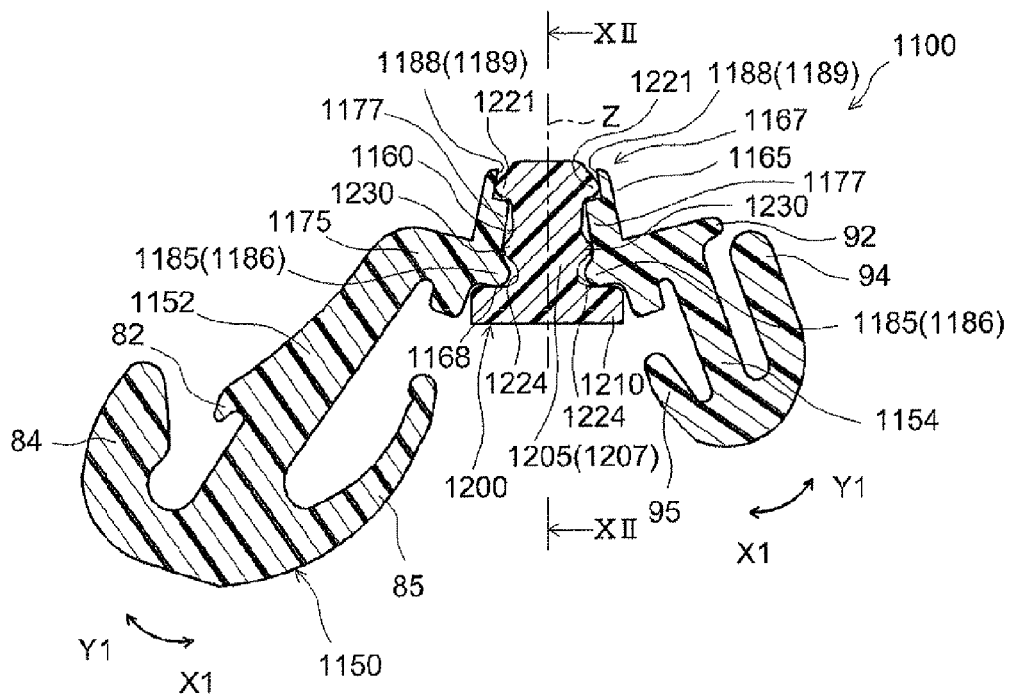
FIG. 11 is a cross-sectional view taken along line XI-XI in FIG. 2, schematically showing the structure of a connecting glass run channel related to another embodiment.
Figure 12:
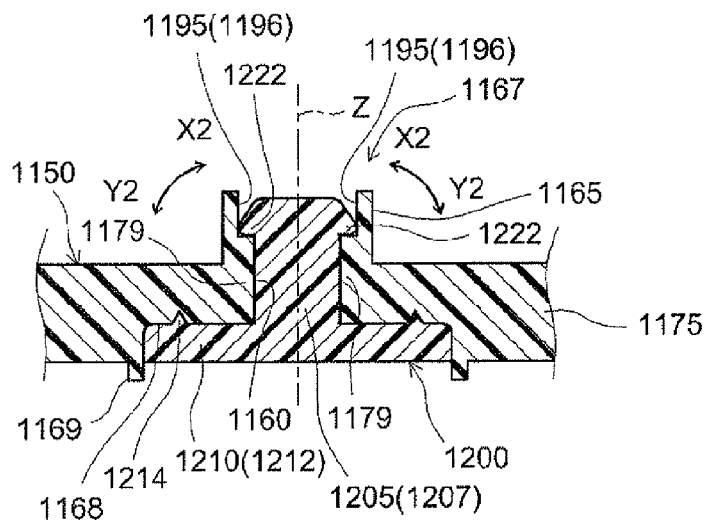
FIG. 12 is a cross-sectional view taken along line XII-XII in FIG. 11, schematically showing the structure of a connecting glass run channel related to still another embodiment.

FIG. 11 is a cross-sectional view taken along line XI-XI in FIG. 2, schematically showing the structure of the connecting glass run channel 1150. FIG. 12 is a partial cross-sectional view taken along line XI-XI in FIG. 11.

As shown in FIGS. 11 and 12, a base bottom portion 1175 of the connecting glass run channel 1150 is provided with a projection portion 1165 that projects from the outer circumferential surface of the base bottom portion 1175. The projection portion 1165 is formed in a shape that is engageable with the engagement hole 40 serving as an engaging portion (to be described below) that provided within the groove 32 of the window frame 22 (inclination frame 58). Moreover, the projection portion 1165 is formed so that an engaging member 1200 to be described below is attachable thereto. Here, the projection portion 1165 configure a protruding portion 1167 that is engageable with the engagement hole 40 that is provided within the groove 32 of the window frame 22 (inclination frame 58), along with a trunk portion 1205 of the engaging member 1200 inserted into and attached to an insertion hole 1160 (to be described below) formed in the projection portion 1165.

Additionally, an inner circumferential surface of the base bottom portion 1175 of the connecting glass run channel 1150 is formed with a base supporting portion 1168 that supports a base portion 1210 of the engaging member 1200 when the engaging member 1200 to be described below is attached. The base supporting portion 1168 is formed in a concave shape that recesses in the outer circumferential direction further than the inner circumferential surface of the base bottom portion 1175. Further, the base supporting portion 1168 is formed in a shape corresponding to the outer shape of the base portion 1210 to be described below and is adapted so as to abut against and support at least a portion of the peripheral edge of the base portion 1210.

Here, within a range corresponding to the base supporting portion 1168 in the connecting glass run channel 1150, the above projection portion 1165 is formed, and the insertion hole 1160 into which the trunk portion 1205 of the engaging member 1200 can be inserted is formed. In the present embodiment, the insertion hole 1160 is a through hole that passes through the base bottom portion 1175 and the projection portion 1165 in the inner and outer circumferential directions. In addition, the shape of the insertion hole 1160 and the projection portion 1165 is not particularly limited, and the cross-sectional shape thereof may be a circular hole, an ellipse, or the like other than a quadrangular shape.

As shown in FIGS. 11 and 12, the periphery of the insertion hole 1160 is surrounded in a tubular shape by lateral inner walls 1177 and lengthwise inner walls 1179. The portions of the lateral inner walls 1177 and the lengthwise inner walls 1179, which project from the outer surface of the base bottom portion 1175 to the outer circumferential side, form the projection portion 1165.

Additionally, the lateral inner walls 1177 are formed in a plate shape along the longitudinal direction of the base bottom portion 1175 of the connecting glass run channel 1150. In the present embodiment, a pair of lateral inner walls 1177, 1177 is arranged at a predetermined interval in the width direction (lateral direction of the base bottom portion 1175).

Additionally, the lengthwise inner walls 1179 are formed in a plate shape along the width direction of the base bottom portion 1175 of the connecting glass run channel 1150. In the present embodiment, a pair of lengthwise inner walls 1179, 1179 is arranged at a predetermined interval in the longitudinal direction (lengthwise direction) of the base bottom portion 1175.

As shown in FIG. 11, first longitudinal-direction locking portions (longitudinal-direction locking portions) 1185, 1185 are formed in regions that face each other in the width direction of the base bottom portion 1175 on the inner circumferential side of the lateral inner walls 1177, 1177. Additionally, the first longitudinal-direction locking portions 1185 include convex portions 1186 that projects toward the central axis Z of the insertion hole 1160. On the other hand, second longitudinal-direction locking portions (longitudinal-direction locking portions) 1188, 1188 are formed in regions that face each other in the width direction of the base bottom portion 1175 on the outer circumferential side of the lateral inner walls 1177, 1177. Additionally, the second longitudinal-direction locking portions 1188 include stepped locking concave portions 1189 that are recessed in a direction away from the central axis Z of the insertion hole 1160.

The convex portions 1186 and the locking concave portions 1189 related to the present embodiment are continuously formed in the direction perpendicular to the central axis Z of the insertion hole 1160, respectively. That is, the convex portions and the locking concave portions are formed so as to extend along the longitudinal direction of the base bottom portion 1175 in the lateral inner walls 1177.

On the other hand, as shown in FIG. 12, first width-direction locking portions (width-direction locking portions) 1195, 1195 are formed on the outer circumferential side of the lengthwise inner walls 1179, 1179. The first width-direction locking portions 1195 includes stepped concave portions 1196 that are recessed in a direction away from the central axis Z of the insertion hole 1160. The concave portions 1196 related to the present embodiment are continuously formed in the direction perpendicular to the central axis Z of the insertion hole 1160. That is, the concave portions are continuously formed along the width direction of the base bottom portion 1175 in the lengthwise inner walls 1179. Additionally, as shown in FIG. 12, a collision preventing ridge 1169 that prevents the window pane 66 from colliding with the engaging member 1200 is formed in the vicinity of the base supporting portion 1168 on the inner circumferential surface of the base bottom portion 1175.

In addition, a pair of the first longitudinal-direction locking portions 1185 and a pair of the second longitudinal-direction locking portions 1188 related to the present embodiment are formed so as to extend along the longitudinal direction of the lateral inner walls 1177 in the regions that face each other in the width direction of the base bottom portion 1175, respectively. However, the first longitudinal-direction locking portions and the second longitudinal-direction locking portions may be formed in a plurality of regions that face each other in the width direction of the base bottom portion 1175 or the first longitudinal-direction locking portion and the second longitudinal-direction locking portion may be formed in any one of the vehicle interior and vehicle exterior lateral inner walls 1177. Additionally, the respective locking portions 1185 and 1188 may be formed in any region of the lateral inner walls 1177 of the base bottom portion 1175, for example, may be formed in the vicinity of intermediate portions (in the vicinity of the central portions) of the lateral inner walls 1177 in the inner and outer circumferential directions.

Additionally, similarly, the first width-direction locking portions 1195 may be formed in a plurality of regions that face each other in the longitudinal direction of the base bottom portion 1175, or the first width-direction locking portion may be formed in any one of the vehicle front or vehicle rear lengthwise inner walls 1179. Additionally, the first width-direction locking portions 1195 may be formed in any region of the lengthwise inner walls 1179 of the base bottom portion 1175, for example, may be formed in the vicinity of intermediate portions (in the vicinity of the central portions) of the lengthwise inner walls 1179 in the inner and outer circumferential directions or on the inner circumferential side. Moreover, although the stepped locking concave portions 1189 and the stepped locking concave portions 1196 assume an annular stepped shape mutually continuously, these portions may not be continuous, or may have a level difference of mutually different depths.

Additionally, all the longitudinal-direction locking portions and the width-direction locking portions may include convex portions that project toward the central axis Z of the insertion hole or concave portions that are recessed in the direction away from the central axis of the insertion hole, and are not limited to the above form. Moreover, the convex portions and the concave portions can be formed perpendicularly or inclinedly with respect to the central axis of the insertion hole.

Figure 13:
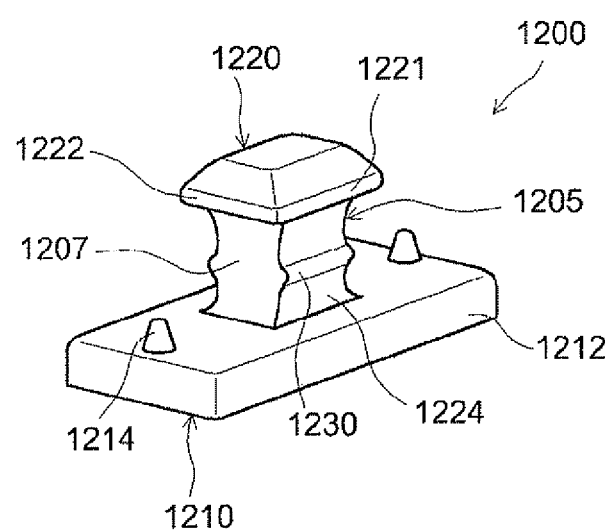
FIG. 13 is a perspective view schematically showing the structure of an engaging member related to still another embodiment.

Next, the engaging member 1200 that configures the glass run channel product 1100 related to the present embodiment and is attached to (inserted into) the insertion hole will be described referring to the drawings. FIG. 13 is a perspective view schematically showing the structure of the engaging member 1200 related to the present embodiment.

The engaging member 1200 related to the present embodiment is a member that is formed in advance separately from the connecting glass run channel 1150. A molded article that is molded from synthetic resin materials that are harder and more rigid than the elastic polymeric material that molds the connecting glass run channel 1150, for example, elastic polymeric materials, such polyacetal (POM) and nylon (polyamide-based resin). In addition, the engaging member 1200 may be a press-formed article, a cast article, a forged article, or the like of a metallic material. Additionally, the engaging member 1200, as shown in FIG. 13, has the flat-plate-like base portion 1210, and the trunk portion 1205 that projects (rises) in a direction away from the base portion 1210.

A flat-plate-like body portion 1212 of the base portion 1210 is molded with a size and shape such that the body portion can fit into the above base supporting portion 1168. The flat-plate-like body portion 1212 has a plurality of positional deviation preventing projections 1214 on the surface that faces the base bottom portion 1175 when attached to the connecting glass run channel 1150. On the other hand, the trunk portion 1205 is formed so as to be capable of being inserted into the insertion hole 1160 and attached to the connecting glass run channel 1150. The protruding portion 1167 composed of the trunk portion 1205 inserted into the insertion hole 1160 and the projection portion 1165 is engageable with the engagement hole 40 formed in the window frame 22 (inclination frame 58).

The trunk portion 1205 has a columnar body portion 1207 of such a size that the trunk portion can be inserted into the insertion hole 1160, and a locking head 1220 that overhangs from the tip of the columnar body portion 1207. Longitudinal-direction locking recesses 1224, to which the first longitudinal-direction locking portions 1185 formed at end portions (that is, inner circumferential end portions of the lateral inner walls 1177) of the lateral inner walls 1177 located on the inner circumferential side of the above base bottom portion 1175 when the engaging member 1200 is attached to the connecting glass run channel 1150 can be locked, are formed on the base portion 1210 side of the columnar body portion 1207. Moreover, longitudinal-direction locking ridge portions 1230 that are locked to the lateral inner walls 1177 that configure the periphery of the insertion hole 1160 are formed in the vicinity of the centers of broad faces (faces parallel to the long sides of the flat-plate-like body portion 1212) of the columnar body portion 1207 in the protruding direction (rising direction).

Additionally, as shown in FIG. 13, the locking head 1220 is set to be larger than the outer shape of the columnar body portion 1207. The locking head 1220 includes longitudinal-direction locking convex portions 1221 that are locked to the second longitudinal-direction locking portions 1188 formed at end portions of the lateral inner walls 1177 (that is, outer circumferential end portions of the lateral inner walls 1177) located on the outer circumferential side of the above base bottom portion 1175. Further, the locking head 1220 includes width-direction locking convex portions 1222 that are locked to the first width-direction locking portions 1195 formed at end portions of the lengthwise inner walls 1179 (that is, outer circumferential end portions of the lengthwise inner walls 1179) located on the outer circumferential side of the base bottom portion 1175.

Next, the functions (actions and effects) of the connecting glass run channel 1150 to which the engaging member 1200 is attached will be described in detail, referring to the drawings.

As shown in FIGS. 11 and 12, the engaging member 1200 is attached to a predetermined position of the connecting glass run channel 1150 by inserting the trunk portion 1205 into the insertion hole 1160 and fitting the base portion 1210 into the base supporting portion 1168.

At this time, as shown in FIG. 11, in the connecting glass run channel 1150, the first longitudinal-direction locking portions 1185, 1185 are locked to the longitudinal-direction locking recesses 1224, 1224 of the engaging member 1200 along the longitudinal direction. Then, the longitudinal-direction locking ridge portions 1230, 1230 of the engaging member 1200 abut against and are locked to the lateral inner walls 1177 among the inner walls that configure the periphery of the insertion hole 1160. Here, in a case where the glass run channel product 1100 including the connecting glass run channel 1150 to which the engaging member 1200 is attached is carried, for example, in a case where the vehicle interior side wall portion 1152 and the vehicle exterior side wall portion 1154 are displaced in directions approaching each other and a force in the direction of arrow X1 of FIG. 11 (the width direction of the base bottom portion 1175) acts, the first longitudinal-direction locking portions 1185, 1185 are displaced in directions approaching each other, fit into the longitudinal-direction locking recesses 1224, 1224, and pinch the trunk portion 1205. For this reason, locking of the connecting glass run channel 1150 to the engaging member 1200 is maintained, and falling-out or the like of the engaging member 1200 can be prevented.

Additionally, the longitudinal-direction locking convex portions 1221, 1221 of the engaging member 1200 are locked to the locking concave portions 1189 and 1189 of the second longitudinal-direction locking portions 1188, 1188. Here, for example, in a case where the vehicle interior side wall portions 1152 or the vehicle exterior side wall portions 1154 are displaced in directions away from each other and a force in a direction of arrow Y1 of FIG. 11 (the width direction of the base bottom portion 1175) acts on the connecting glass run channel 1150, since the second longitudinal-direction locking portions 1188, 1188 are displaced in directions approaching each other and locking of the longitudinal-direction locking portions 1188, 1188 and the locking convex portions 1221, 1221 becomes strong, falling-out or the like of the engaging member 1200 can be prevented.

As shown in FIG. 12, in the connecting glass run channel 1150, the width-direction locking convex portions 1222, 1222 of the engaging member 1200 are locked to the concave portions 1196, 1196 of the first width-direction locking portions 1195, 1195 along the width direction. Here, for example, in a case where the glass run channel product 1100 is deformed in the longitudinal direction and the force in a direction of arrow X2 of FIG. 12 (the longitudinal direction of the base bottom portion 1175) acts on the connecting glass run channel 1150, since the first width-direction locking portions 1195, 1195 are displaced in directions approaching each other and locking of the locking portions 1195, 1195 and the locking convex portions 1222, 1222 becomes strong, falling-out or the like of the engaging member 1200 can be prevented.

Additionally, for example, in a case where the glass run channel product 1100 is deformed in the longitudinal direction and the force in a direction of arrow Y2 of FIG. 12 (the longitudinal direction of the base bottom portion 1175) acts on the connecting glass run channel 1150, the step that forms the base supporting portion 1168 of the base bottom portion 1175 pinches the base portion 1210 (flat-plate-like body portion 1212) of the engaging member 1200. Additionally, deformation of the base bottom portion 1175 can be suppressed by arranging the base portion 1210 formed from a material harder than the base bottom portion 1175 at the concave base supporting portion 1168 of the base bottom portion 1175 as in the present embodiment. For this reason, the positional deviation or falling-out of the engaging member 1200 can be effectively prevented.

In addition, as described above, as the connecting glass run channel 1150 is deformed in the longitudinal direction or the width direction, and thereby, the base bottom portion 1175 may be deformed and the outer circumferential end portions or inner circumferential end portions of the lateral inner walls 1177 or the lengthwise inner walls 1179 may be displaced. However, a situation where displacement of one inner wall displaces the other inner wall may occur simultaneously.

For example, if the lateral inner walls 1177 and the lengthwise inner walls 1179 are continuously formed in a tubular shape as in the present embodiment, in a case where the vehicle interior side wall portion 1152 and the vehicle exterior side wall portion 1154 are displaced in directions approaching each other, the outer circumferential end portions of the lateral inner walls 1177, 1177 are displaced in directions away from each other, but the outer circumferential end portions of the lengthwise inner walls 1179, 1179 can be pulled in directions approaching each other by the displacement of the lateral inner walls 1177, 1177. On the other hand, in a case where the outer circumferential end portions of the lateral inner walls 1177, 1177 are displaced in directions approaching each other, the outer circumferential end portions of the lengthwise inner walls 1179, 1179 are displaced in a direction away from each other.

In this way, the insertion hole 1160 surrounded by the lateral inner walls 1177 and the lengthwise inner walls 1179 is deformed typically in the longitudinal direction and the width direction.

In contrast, when the engaging member 1200 is attached to the base bottom portion 1175 of the connecting glass run channel 1150, the first longitudinal-direction locking portions 1185 formed at the lateral inner walls 1177 of the insertion hole 1160 is locked to the width-direction locking recesses 1224 of the engaging member 1200. Further, the second longitudinal-direction locking portions 1188 and the first width-direction locking portions 1195 formed at the lengthwise inner walls 1179 are locked to every side of the trunk portion 1205 (locking head 1220) of the engaging member 1200, that is, the longitudinal-direction locking convex portions 1221 and width-direction locking convex portions 1222. For this reason, against changes (deformation) of the insertion hole 1160 that may occur, for example, in a case where the glass run channel assembly 1105 (that is, the glass run channel product 1100) including the engaging member 1200 is carried, positional deviation, falling-out, or the like of the engaging member 1200 can be prevented.

Next, the connecting glass run channel 1150 in a state where the connecting glass run channel 1150 to which the engaging member 1200 is attached is mounted within the groove 32 formed at a predetermined position of the window frame 22 (inclination frame 58) will be described in detail, referring to the drawings.

Figure 14:
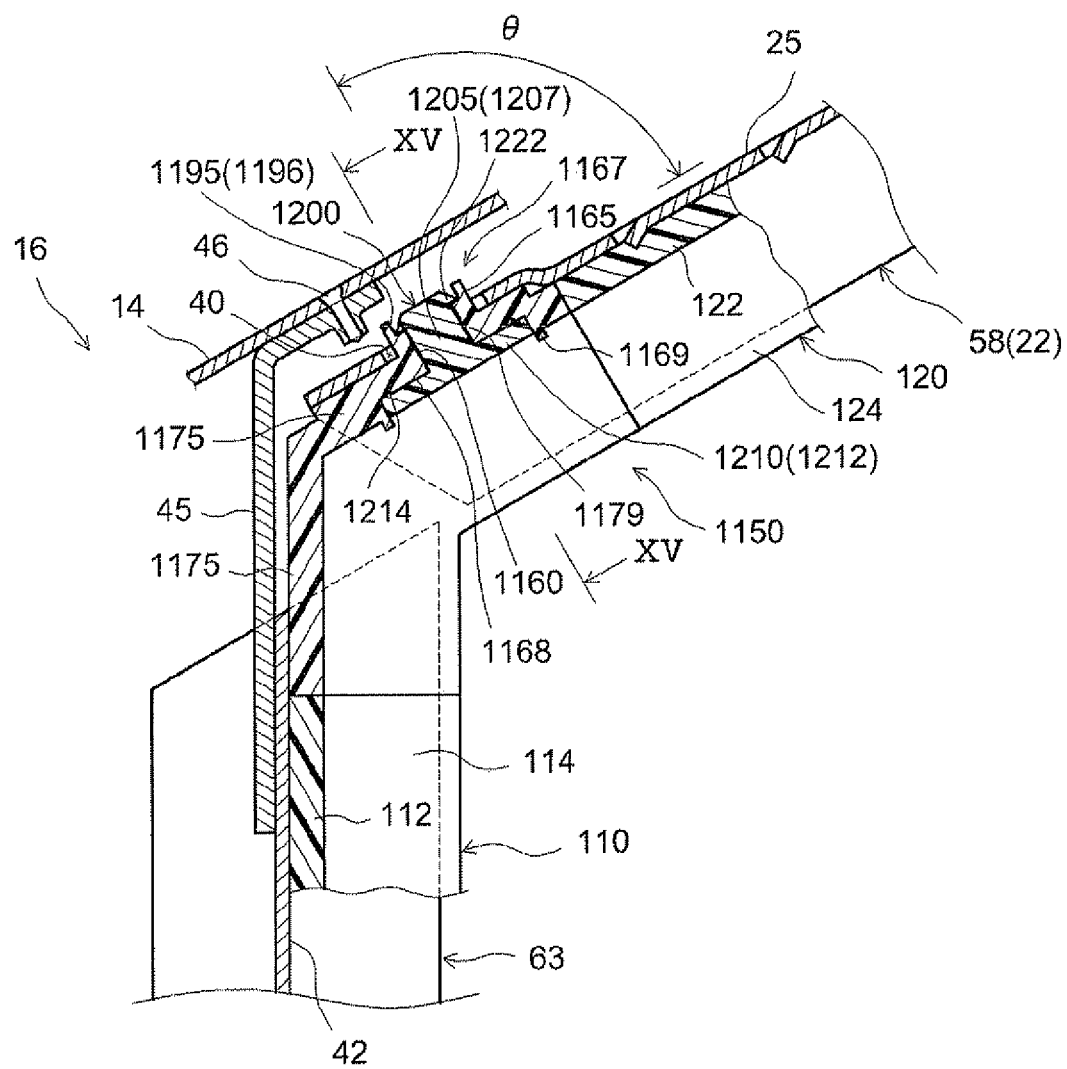
FIG. 14 is a cross-sectional view taken along line XIV-XIV in FIG. 13.
Figure 15:
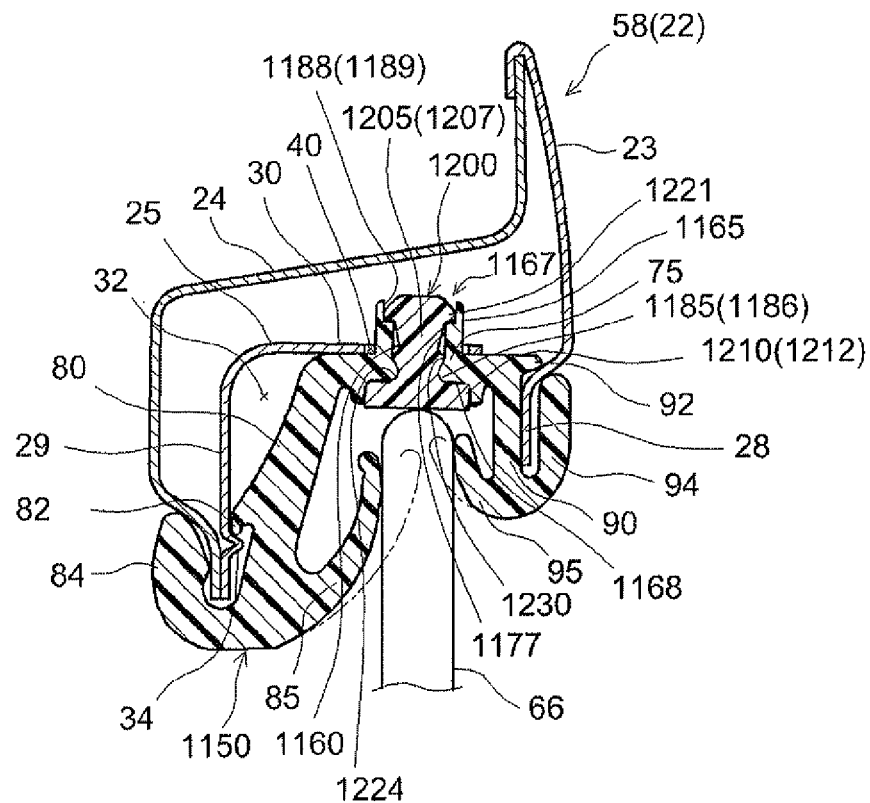
FIG. 15 is a cross-sectional view taken along line XV-XV in FIG. 14.

FIG. 14 is a cross-sectional view showing the configuration of the front corner portion 16 where the front-pillar-side vertical side frame 63 and the inclination frame 58 intersect each other at a predetermined intersection angle, and showing when the connecting glass run channel 1150 related to the second embodiment arranged in the relevant portion is viewed from the vehicle exterior. FIG. 15 is a cross-sectional view taken along line XV-XV in FIG. 14.

As shown in FIGS. 14 and 15, the engagement hole 40 serving as an engaging portion is formed in the region corresponding to the protruding portion 1167, of the above stopper 25 that is a window frame component member. The engagement hole 40 has a size such that the above protruding portion 1167 can be inserted (passed) therethrough.

As shown in FIGS. 14 and 15, the engaging member 1200 is attached to a predetermined position of the connecting glass run channel 1150 by inserting the trunk portion 1205 into the insertion hole 1160 and fitting the base portion 1210 into the base supporting portion 1168. Then, the protruding portion 1167 composed of the projection portion 1165 and trunk portion 1205 is inserted through and engaged with the engagement hole 40 formed in the window frame 22, and the connecting glass run channel 1150 to which the engaging member 1200 is attached is mounted within the groove 32 of the window frame 22.

At this time, as shown in FIG. 15, the first longitudinal-direction locking portions 1185 fit into and are locked to the longitudinal-direction locking recesses 1224 of the engaging member 1200. Then, the longitudinal-direction locking ridge portions 1230 of the engaging member 1200 abut against and are locked to the lateral inner walls 1177 among the inner walls that configure the periphery of the insertion hole 1160. Then, the longitudinal-direction locking convex portions 1221 of the engaging member 1200 are locked to the locking concave portions 1189 of the second longitudinal-direction locking portions 1188. Additionally, as shown in FIG. 14, the width-direction locking convex portions 1222 of the engaging member 1200 are locked to the concave portions 1196 of the first width-direction locking portions 1195. For this reason, in the connecting glass run channel 1150 mounted within the groove 32 formed at a predetermined position of the window frame 22 (inclination frame 58), the engaging member 1200 firmly engages with the connecting glass run channel 1150 not only in the width direction but also in the longitudinal direction. Therefore, positional deviation, falling-out, or the like of the engaging member 1200 from the connecting glass run channel 1150 is prevented.

Additionally, as shown in FIG. 14, in a case where the force to move (positional deviation) the connecting glass run channel 1150 mounted on the inclination frame 58 in the longitudinal direction (particularly, a certain direction of the horizontal frame 56 or the center-pillar-side vertical side frame 61) along the inclination frame 58 is exerted on the connecting glass run channel, the outer wall face of the protruding portion 1167, that is, in the present embodiment, the outer wall face of the projection portion 1165 abuts against the peripheral edge of the engagement hole 40. Since the mechanical strength of the protruding portion 1167 is reinforced by the trunk portion 1205 of the engaging member 1200 that is fixed within the insertion hole 1160, movement of the connecting glass run channel 1150 is regulated by this abutment, so that positional deviation in the longitudinal direction can be prevented. Here, although the intersection angle θ between the rising direction of the projection portion 1165 of the present embodiment and the stopper 25 is perpendicular, it is preferable to determine the rising direction of the projection portion 1165 (that is, determine the formation direction of the insertion hole 1160) so that the intersection angle θ becomes an acute angle. By setting the intersection angle θ to an acute angle, the connecting glass run channel 1150 can be prevented from falling out of the stopper 25 during use.

In addition, reference numeral 112 in FIG. 14 represents a base bottom portion of a first glass run channel, reference numeral 114 represents a vehicle interior side wall portion of the first glass run channel, reference numeral 122 represents a base bottom portion of a second glass run channel, and reference numeral 124 represents a vehicle interior side wall portion of the second glass run channel.

As described above, in the connecting glass run channel 1150 having a configuration in which the engaging member 1200 related to the present embodiment is attached, a separate member that is molded in advance is used as a hard engaging member 1200. Thereby, unlike the configuration in which the projection is integrally molded by an injection molding method within a molding die into which an insert member is inserted as in the above conventional art example, the protruding portion 1167 that has excellent mechanical strength can be formed by virtue of the easy operation of mounting the engaging member 1200 at a predetermined position of the connecting glass run channel 1150. Also, since the engaging member 1200 may be attached to the base bottom portion 1175 that configures the main body of the connecting glass run channel 1150 afterward, constraints on the material and shape that configure the engaging member 1200 can also be reduced.

Figure 16:
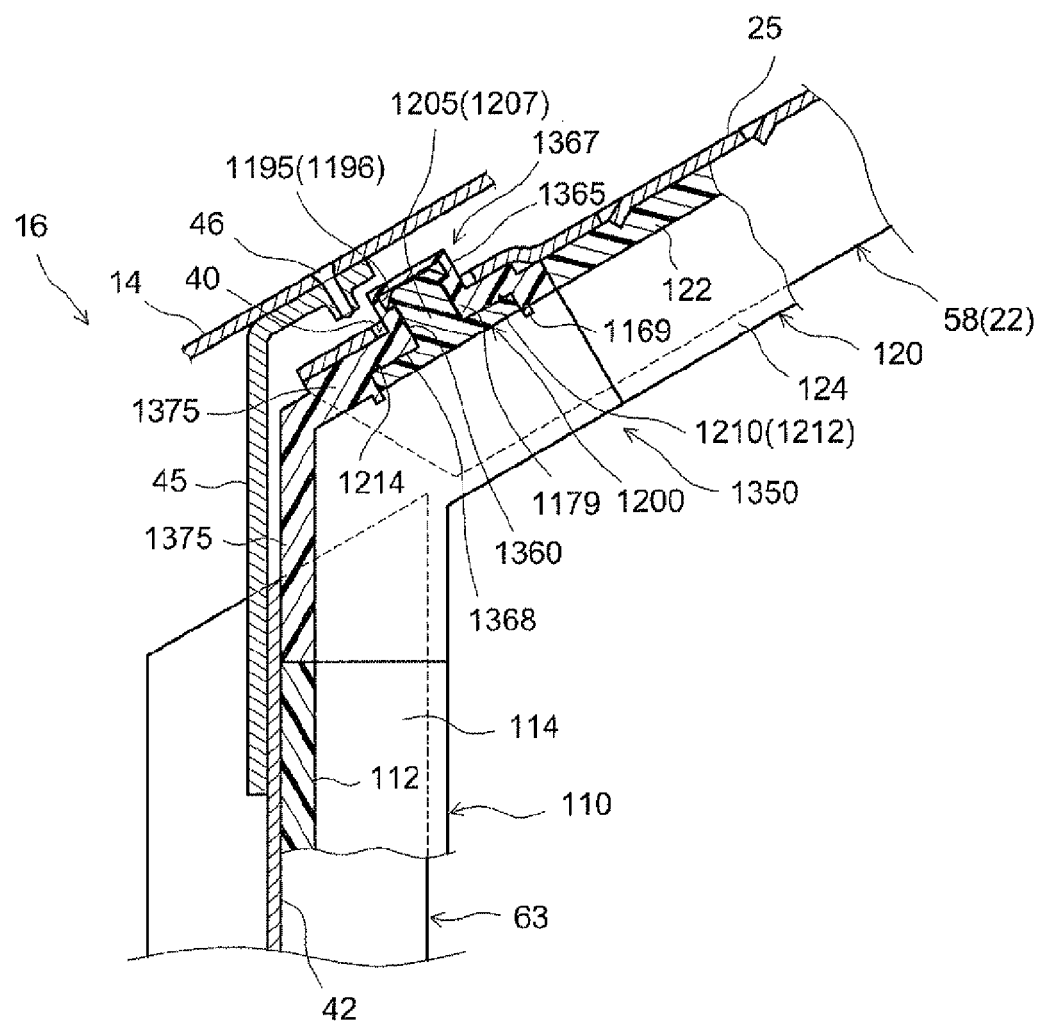
FIG. 16 is a cross-sectional view schematically showing the structure and mounting state of the connecting glass run channel related to one modification.

The shape of the projection portion is not limited to that of the above second embodiment. For example, modifications as will be described below are given. FIG. 16 is a cross-sectional view schematically showing the structure and mounting state of a connecting glass run channel 1350 related to a first modification of the second embodiment.

As shown in FIG. 16, a base bottom portion 1375 of the connecting glass run channel 1350 is provided with a projection portion 1365 that projects from the outer circumferential surface. The projection portion 1365 is formed in a shape that is engageable with the engagement hole 40 of the window frame 22 (inclination frame 58). Moreover, the projection portion 1365 is formed so that the engaging member 1200 is attached thereto. The projection portion 1365 configures a protruding portion 1367 that is engageable with the engagement hole 40 of the window frame 22, together with the trunk portion 1205 of the engaging member 1200 that is inserted into and attached to an insertion hole 1360 to be described below. Additionally, an inner circumferential surface of the base bottom portion 1375 of the connecting glass run channel 1350 is formed with a base supporting portion 1368 that supports the base portion 1210 of the engaging member 1200 when the engaging member 1200 is attached. The base supporting portion 1368 is formed in a concave shape that recesses in the outer circumferential direction further than the inner circumferential surface of the base bottom portion 1375, and is formed in a shape corresponding to the outer shape of the base portion 1210, and is adapted so as to abut against and support at least a portion of the peripheral edge of the base portion 1210.

Here, within a range corresponding to the base supporting portion 1368 in the connecting glass run channel 1350, the above projection portion 1365 is formed, and the insertion hole 1360 into which the trunk portion 1205 of the engaging member 1200 can be inserted is formed. In the present modification, the insertion hole 1360 is a non-through hole that opens to the inner circumferential side of the base bottom portion 1375 and is closed at the outer circumferential side of the projection portion 1365.

Through this configuration, in addition to the same effects as the case of the second embodiment, the projection portion 1365 is not easily deformed and deformation of the insertion hole 1360 can be suppressed because the insertion hole 1360 does not pass through the projection portion. Moreover, since the insertion hole 1360 does not pass through the projection portion 1365, waterdrops can be prevented from entering the groove of the connecting glass run channel 1350 from the periphery of the engaging member 1200.

Figure 17:
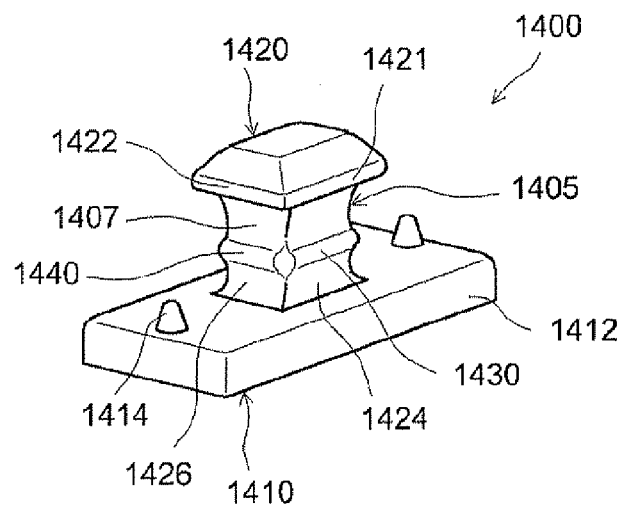
FIG. 17 is a perspective view schematically showing the structure of an engaging member related to still another modification.
Figure 18:
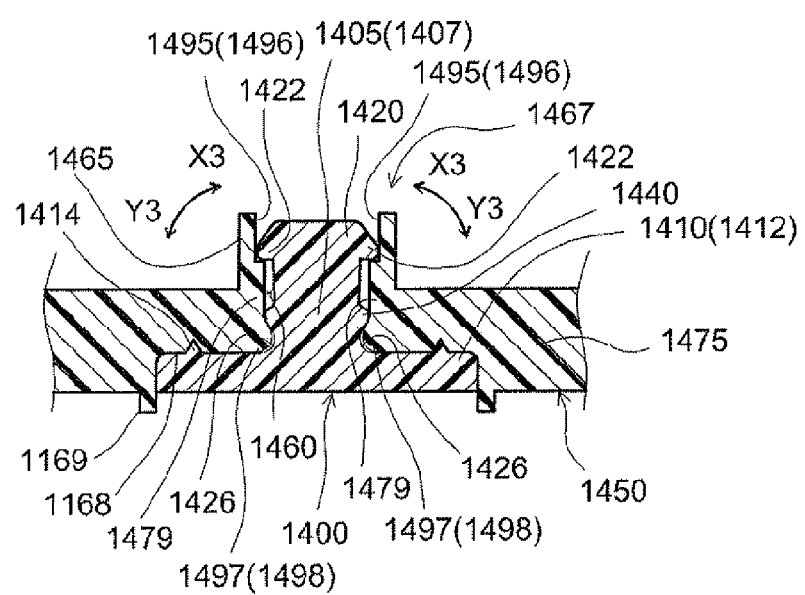
FIG. 18 is a cross-sectional view schematically showing the structure of a connecting glass run channel to which the engaging member related to still another modification is attached.

The shape of the engaging member is not limited to those of the above embodiments and modifications. For example, modifications as will be described below are provided. FIG. 17 is a perspective view schematically showing the structure of an engaging member 1400 related to a second modification of the second embodiment. FIG. 18 is a cross-sectional view schematically showing the structure of a connecting glass run channel 1450 to which the engaging member 1400 related to the second modification of the second embodiment is attached.

As shown in FIG. 17, the engaging member 1400 related to the present modification includes a base portion 1410 having a flat-plate-shaped body portion 1412 and a positional deviation preventing projection 1414 that are similar to the engaging member 1200 related to the above second embodiment.

On the other hand, the trunk portion 1405 that characterizes the engaging member 1400 related to the present modification includes a columnar body portion 1407 having longitudinal-direction locking recesses 1424 and longitudinal-direction locking ridge portion 1430 and a locking head 1420 having longitudinal-direction locking convex portions 1421 and width-direction locking convex portions 1422, which are similar to the engaging member 1200 related to the above second embodiment. Moreover, width-direction locking recesses 1426 are formed on the base portion 1410 side of the columnar body portion 1407. The locking recesses 1426 are capable of being locked to the second width-direction locking portions (width-direction locking portions) 1497 (convex portions 1498) formed at the lengthwise inner walls 1479 located on the inner circumferential side of the above base bottom portion 1475 when the engaging member 1400 is attached to the connecting glass run channel 1450 (refer to FIG. 18). Furthermore, width-direction locking ridge portions 1440 that are locked to the lengthwise inner walls 1479 are formed in the vicinity of the center of narrow faces (faces parallel to the short sides of the flat-plate-like body portion 1412) of the columnar body portion 1407 in the protruding direction (the rising direction). In addition, a protruding portion 1467 composed of the trunk portion 1405 and the projection portion 1465 inserted into the insertion hole 1460 can be engaged with the engagement hole 40 formed in the window frame 22 (inclination frame 58).

As shown in FIG. 18, in the connecting glass run channel 1450, the width-direction locking convex portions 1422, 1422 of the engaging member 1400 are locked to the concave portions 1496, 1496 of the first width-direction locking portions (width-direction locking portions) 1495, 1495 along the width direction. Here, in a case where a force in the direction of arrow X3 or Y3 of FIG. 18 (the longitudinal direction of the base bottom portion 1475) acts on the connecting glass run channel 1450, in addition to the same configuration as the second embodiment, the locking recesses 1426 and the width-direction locking ridge portions 1440 are formed. Thereby, falling-out of the engaging member 1400 in a case where the base bottom portion 1475 of the connecting glass run channel 1450 is deformed in the longitudinal direction can be more favorably prevented.

Although specific examples of the invention have been described in detail above referring to the drawings, these examples are merely illustrative, and do not limit the claims thereof. The art set forth in the claims includes various alterations and modifications of the specific examples illustrated above.

For example, in the above respective embodiments and modification, the engaging member 200 is attached to the connecting glass run channel 150 formed between the first glass run channel 110 and the second glass run channel 120 (or the engaging member 1200 is attached to the connecting glass run channel 1150). However, the engaging member may be mounted on other connecting glass run channels. Additionally, it is not necessary to provide the projection portions in all connecting glass run channels or to attach the engaging members to all connecting glass run channels, a required number of projection portions can be formed in required regions and a reinforcing member can be mounted.

Additionally, the above embodiments relates to a glass run channel product mounted on a sash door frame (window frame) made of a sash (that is, an elongated material obtained by bending and forming a band steel plate in a predetermined cross-sectional shape, for example, a shape shown in FIG. 3 by a cold roll forming method). However, the application of the invention is not limited to such a sash door. For example, the invention can also be suitably applied to a press door frame (window frame) that forms a door frame integral with a door panel in a remaining portion by punching a portion equivalent to a window opening portion of the door panel by press working.

Industrial Applicability

According to the invention, the protrusion that is positional deviation preventing means can be formed by easy work of attaching the engaging member that is separately molded in advance to the glass run channel assembly (connecting glass run channel) afterward. In addition, for example, in a case where the glass run channel assembly to which the engaging member is attached is carried, there is provided the glass run channel assembly that can prevent the engaging member from positionally deviating or falling out in a falling-out direction from the base bottom portion of the connecting glass run channel.

REFERENCE SIGNS LIST

1: CAR (VEHICLE)
6: FRONT DOOR
6A: REAR DOOR
8, 8A: DOOR BODY
10: DOOR BODY UPPER EDGE
12, 12A: DOOR OUTER PANEL
14: DOOR INNER PANEL
16: FRONT CORNER PORTION
18: REAR CORNER PORTION
19: LOWER SASH
22, 22A: DOOR FRAME (WINDOW FRAME)
23: VEHICLE EXTERIOR DOOR FRAME
24: VEHICLE INTERIOR DOOR FRAME
25: STOPPER
28: VEHICLE EXTERIOR SIDE WALL
29: VEHICLE INTERIOR SIDE WALL
30: BOTTOM WALL
32: GROOVE
34: PROTRUSION
40: ENGAGEMENT HOLE
42: BOTTOM WALL PORTION
45: JOINT FITTING
46: SCREW
50, 50A: UPPER SIDE FRAME
56: HORIZONTAL FRAME
58, 58A: INCLINATION FRAME
60: CENTER PILLAR
61, 61A: CENTER-PILLAR-SIDE VERTICAL SIDE FRAME
62: FRONT PILLAR
63: FRONT-PILLAR-SIDE VERTICAL SIDE FRAME
64: REAR PILLAR
65: REAR-PILLAR-SIDE VERTICAL SIDE FRAME
66: WINDOW PANE
70: WINDOW OPENING PORTION
75: BASE BOTTOM PORTION
79: LOW FRICTION LAYER
80: VEHICLE INTERIOR SIDE WALL PORTION
82: VEHICLE INTERIOR LOCKING PROTRUSION
84: VEHICLE INTERIOR FOLDED LIP
85: VEHICLE INTERIOR SEAL LIP
90: VEHICLE EXTERIOR SIDE WALL PORTION
92: VEHICLE EXTERIOR LOCKING PROTRUSION
94: VEHICLE EXTERIOR FOLDED LIP
95: VEHICLE EXTERIOR SEAL LIP
100, 100A: GLASS RUN CHANNEL PRODUCT
105: GLASS RUN CHANNEL ASSEMBLY
110: FIRST GLASS RUN CHANNEL
112: BASE BOTTOM PORTION OF FIRST GLASS RUN CHANNEL
114: VEHICLE INTERIOR SIDE WALL PORTION OF FIRST GLASS RUN CHANNEL
120: SECOND GLASS RUN CHANNEL
122: BASE BOTTOM PORTION OF SECOND GLASS RUN CHANNEL
124: VEHICLE INTERIOR SIDE WALL PORTION OF SECOND GLASS RUN CHANNEL
130: THIRD GLASS RUN CHANNEL
140: FOURTH GLASS RUN CHANNEL
150, 150A, 150B: CONNECTING GLASS RUN CHANNEL
160: INSERTION HOLE (THROUGH HOLE)
165: PROJECTION PORTION
167: PROTRUDING PORTION
168: BASE SUPPORTING PORTION
169: COLLISION-PREVENTING RIDGE
170: LOCKING CONVEX PORTION (FIRST LOCKING PORTION)
172, 172A: LOCKING STEP PORTION (SECOND LOCKING PORTION)
175: BASE BOTTOM PORTION
177: LATERAL INNER WALL
179: LENGTHWISE INNER WALL
180: VEHICLE INTERIOR SIDE WALL PORTION
190: VEHICLE EXTERIOR SIDE WALL PORTION
200: ENGAGING MEMBER
205: TRUNK PORTION
207: COLUMNAR BODY PORTION
210: BASE PORTION
212: FLAT-PLATE-LIKE BODY PORTION OF BASE PORTION
214: POSITIONAL DEVIATION PREVENTING PROJECTION
220: LOCKING HEAD
224: LOCKING CONCAVE PORTION
230: FIRST LOCKING RIDGE PORTIONS
235, 235A: SECOND LOCKING RIDGE PORTION
350: CONNECTING GLASS RUN CHANNEL
360: INSERTION HOLE

365: PROJECTION PORTION
367: PROTRUDING PORTION
375: BASE BOTTOM PORTION
1100, 1100A: GLASS RUN CHANNEL PRODUCT
1105: GLASS RUN CHANNEL ASSEMBLY
1150, 1150A, 1150B: CONNECTING GLASS RUN CHANNEL
1152: VEHICLE INTERIOR SIDE WALL PORTION
1154: VEHICLE EXTERIOR SIDE WALL PORTION
1160: INSERTION HOLE (THROUGH HOLE)
1165: PROJECTION PORTION
1167: PROTRUDING PORTION
1168: BASE SUPPORTING PORTION
1169: COLLISION-PREVENTING RIDGE
1175: BASE BOTTOM PORTION
1177: LATERAL INNER WALL
1179: LENGTHWISE INNER WALL
1185: FIRST LONGITUDINAL-DIRECTION LOCKING PORTION (LONGITUDINAL-DIRECTION LOCKING PORTION)
1186 CONVEX PORTION
1188: SECOND LONGITUDINAL-DIRECTION LOCKING PORTION (LONGITUDINAL-DIRECTION LOCKING PORTION)
1189: LOCKING CONCAVE PORTION
1195: FIRST WIDTH-DIRECTION LOCKING PORTION (WIDTH-DIRECTION LOCKING PORTION)
1196: CONCAVE PORTION
1200: ENGAGING MEMBER
1205: TRUNK PORTION
1207: COLUMNAR BODY PORTION
1210: BASE PORTION
1212: FLAT-PLATE-LIKE BODY PORTION OF BASE PORTION
1214: POSITIONAL DEVIATION PREVENTING PROJECTION
1220: LOCKING HEAD
1221: LONGITUDINAL-DIRECTION LOCKING CONVEX PORTION
1222: WIDTH-DIRECTION LOCKING CONVEX PORTION
1224: LONGITUDINAL-DIRECTION LOCKING RECESS
1230: LONGITUDINAL-DIRECTION LOCKING RIDGE PORTION
1350: CONNECTING GLASS RUN CHANNEL
1360: INSERTION HOLE
1365: PROJECTION PORTION
1367: PROTRUDING PORTION
1368: BASE SUPPORTING PORTION
1375: BASE BOTTOM PORTION
1400: ENGAGING MEMBER
1405: TRUNK PORTION
1407: COLUMNAR BODY PORTION
1410: BASE PORTION
1412: FLAT-PLATE-LIKE BODY PORTION
1414: POSITIONAL DEVIATION PREVENTING PROJECTION
1420: LOCKING HEAD
1421: LONGITUDINAL-DIRECTION LOCKING CONVEX PORTION
1422: WIDTH-DIRECTION LOCKING CONVEX PORTION
1424: LONGITUDINAL-DIRECTION LOCKING RECESS
1426: WIDTH-DIRECTION LOCKING RECESS
1430: LONGITUDINAL-DIRECTION LOCKING RIDGE PORTION
1440: WIDTH-DIRECTION LOCKING RIDGE PORTION
1450: CONNECTING GLASS RUN CHANNEL
1460: INSERTION HOLE
1475: BASE BOTTOM PORTION
1479: LENGTHWISE INNER WALL
1495: FIRST WIDTH-DIRECTION LOCKING PORTION (WIDTH-DIRECTION LOCKING PORTION)
1496: CONCAVE PORTION
1497: SECOND WIDTH-DIRECTION LOCKING PORTION (WIDTH-DIRECTION LOCKING PORTION
1498: CONVEX PORTION

The invention claimed is:

1. A glass run channel assembly mounted on a vehicle, the glass run channel assembly comprising:
  a first elongated glass run channel of a predetermined length that is extrusion-molded in a predetermined cross-sectional shape from an elastic polymeric material;
  a second elongated glass run channel of a predetermined length that is extrusion-molded in a predetermined cross-sectional shape from an elastic polymeric material; and
  a connecting glass run channel that is a glass run channel injection-molded from an elastic polymeric material and connects integrally longitudinal terminals of the first and second glass run channels,
  wherein the first and second glass run channels and the connecting glass run channel include,
    a base bottom portion arranged at a position that faces an end face of an up and down moving window pane, which moves up and down while being guided by a window frame, when each glass run channel is mounted within a groove formed at a predetermined position of the window frame of a vehicle;
    a side wall portion that integrally projects toward an inner circumferential side from the base bottom portion at a predetermined intersection angle with respect to the base bottom portion from at least a vehicle interior end of the base bottom portion in a width direction; and
    a seal lip that projects toward the base bottom portion in a folded shape from a protruding tip side of the side wall portion,
  wherein the base bottom portion of the connecting glass run channel is formed with an insertion hole to which an engaging member is configured to be attached, the engaging member being molded in advance from a material that is harder and more rigid than the elastic polymeric material of the connecting glass run channel and including: a base portion that is arranged at the base bottom portion; and a trunk portion that projects in a direction away from the base portion and that is formed so as to be engageable with an engaging portion provided within the groove of the window frame when the connecting glass run channel is mounted on the window frame, and
  wherein an inner wall that configures a periphery of the insertion hole is formed with a first locking portion that is displaced toward a central axis of the insertion hole when the side wall portion of the connecting glass run channel is displaced in the width direction, and
  wherein the base bottom portion of the connecting glass run channel is configured so that the first locking portion presses the trunk portion and is locked to the trunk portion when the connecting glass run channel to which the engaging member is attached is mounted within the groove formed at the predetermined position of the window frame.

2. The glass run channel assembly according to claim 1, wherein the first locking portion is formed at an end portion of the inner wall that configures the periphery of the insertion hole and is located at the inner circumferential side of the base bottom portion.

3. The glass run channel assembly according to claim 1, wherein a second locking portion, which is locked to a tip side of the trunk portion of the engaging member when the side wall portion of the connecting glass run channel is displaced in the width direction, is formed at an end portion of the inner wall that configures the periphery of the insertion hole and is located on an outer circumferential side of the base bottom portion.

4. The glass run channel assembly according to claim 1, wherein the first locking portion is formed in a convex shape that projects toward the central axis of the insertion hole.

5. The glass run channel assembly according to claim 4, wherein a plurality of the first locking portions are formed at regions of the inner wall configuring the periphery of the insertion hole, the regions of the inner wall facing each other in the width direction.

6. The glass run channel assembly according to claim 1, wherein a portion of the base bottom portion peripheral to the insertion hole has a projection portion that projects toward an outer circumferential direction from an outer circumferential surface of the base bottom portion, and wherein the projection portion is formed so as to configure a protruding portion, which engages with the engaging portion, along with the trunk portion of the engaging member inserted into the insertion hole.

7. The glass run channel assembly according to claim 6, wherein the insertion hole is a through hole that passes through the base bottom portion and the projection portion in inner and outer circumferential directions.

8. The glass run channel assembly according to claim 6, wherein the insertion hole is a non-through hole that opens to the inner circumferential side of the base bottom portion and is closed at an outer circumferential side of the projection portion.

9. The glass run channel assembly according to claim 1, wherein an inner circumferential surface of the base bottom portion of the connecting glass run channel is formed with a base supporting portion that supports the base portion of the engaging member when the trunk portion of the engaging member is inserted into and attached to the insertion hole, and wherein the base supporting portion is formed in a concave shape that recesses in an outer circumferential direction further than the inner circumferential surface of the base bottom portion of the connecting glass run channel.

10. A glass run channel product comprising:
the glass run channel assembly according to claim 1; and
the engaging member according to claim 1, wherein the engaging member is attached to the glass run channel assembly.

11. The glass run channel product according to claim 10, wherein the trunk portion of the engaging member is formed with a locking concave portion to which the first locking portion is locked, and wherein the first locking portion is locked to the locking concave portion in a state where the side wall portion of the connecting glass run channel is displaced in the width direction.

12. A glass run channel assembly mounted on a vehicle, the glass run channel assembly comprising:
a first elongated glass run channel of a predetermined length that is extrusion-molded in a predeteiuiined cross-sectional shape from an elastic polymeric material;
a second elongated glass run channel of a predetermined length that is extrusion-molded in a predetermined cross-sectional shape from an elastic polymer material; and
a connecting glass run channel that is a glass run channel injection-molded from an elastic polymeric material and connects integrally longitudinal terminals of the first and second glass run channels,
wherein the first and second glass run channels and the connecting glass run channel include,
a base bottom portion arranged at a position that faces an end face of an up and down moving window pane, which moves up and down while being guided by a window frame, when each glass run channel is mounted within a groove formed at a predetermined position of the window frame of a vehicle;
a side wall portion that integrally projects toward an inner circumferential side from the base bottom portion at a predetermined intersection angle with respect to the
base bottom portion from at least a vehicle interior end of the base bottom portion in a width direction; and
a seal lip that projects toward the base bottom portion in a folded shape from a protruding tip side wall portion,
wherein the base bottom portion of the connecting glass run channel is provided with a projection portion that projects from an outer circumferential surface, and the projection portion is configured to be engageable with an engaging portion of a window frame constituent member provided within the groove of the window frame when the connecting glass run channel is mounted on the predetermined position of the window frame,
wherein the projection portion is formed so that an engaging member, which is molded in advance from a material that is harder and more rigid than the elastic polymeric material of the connecting glass run channel and including: a base portion that is arranged at the base bottom portion; and a trunk portion that projects in a direction away from the base portion, is attachable thereto,
wherein an inner circumferential surface of the base bottom portion of the connecting glass run channel is formed with a base supporting portion that supports the base portion of the engaging member when the engaging member is attached,
wherein the projection portion and an insertion hole to which the trunk portion of the engaging member is configured to be inserted are formed within a range corresponding to the base supporting portion, and the insertion hole is formed from the base bottom portion to the projection portion, and
wherein a longitudinal-direction inner wall and a width-direction inner wall of the connecting glass run channel that configure a periphery of the insertion hole is formed with at least one longitudinal-direction locking portion and at least one width-direction locking portion, which are locked to the trunk portion of the engaging member when the engaging member is inserted into the insertion hole.

13. The glass run channel assembly according to claim 12, wherein the inner wall that configures the periphery of the insertion hole and is located at the inner circumferential side of the base bottom portion is formed with at least one of the longitudinal-direction locking portion and the width-direction locking portion.

14. The glass run channel assembly according to claim 12, wherein the inner wall that configures the periphery of the insertion hole and is located on the outer circumferential side of the base bottom portion is formed with at least one of the longitudinal-direction locking portion and the width-direction locking portion.

15. The glass run channel assembly according to claim 2, wherein at least one of the longitudinal-direction locking portion and the width-direction locking portion includes a convex portion that projects toward a central axis of the insertion hole or a concave portion that is recessed in a direction away from the central axis of the insertion hole.

16. The glass run channel assembly according to claim 15, wherein the concave portion is formed at an end portion of the inner wall that is located on the outer circumferential side of the base bottom portion.

17. The glass run channel assembly according to claim 13, wherein the insertion hole is a through hole that passes through the base bottom portion and the projection portion in inner and outer circumferential directions.

18. The glass run channel assembly according to claim 2, wherein the insertion hole is a non-through hole that opens to the inner circumferential side of the base bottom portion and is closed at an outer circumferential side of the projection portion.

19. The glass run channel assembly according to claim 12, wherein the longitudinal-direction locking portion and the width-direction locking portion are continuously formed in a direction perpendicular to a central axis of the insertion hole.

20. The glass run channel assembly according to claim 12, wherein the base supporting portion is formed in a concave shape that recesses in an outer circumferential direction further than the inner circumferential surface of the base bottom portion of the connecting glass run channel.

21. A glass run channel product comprising:
the glass run channel assembly according to claim 12 and
the engaging member according to claim 12, wherein the engaging member is attached to the glass run channel assembly.

22. The glass run channel product according to claim 21, wherein at least one of the longitudinal-direction locking portion and the width-direction locking portion includes a convex portion that projects toward the central axis of the insertion hole,
wherein the trunk portion of the engaging member is formed with a locking concave portion that is locked to the convex portion, and
wherein the convex portion is locked to the locking concave portion in a state where the engaging member is inserted into the insertion hole.

23. The glass run channel product according to claim 22, wherein the convex portion is formed at the inner wall that is located at the inner circumferential side of the base bottom portion, and
wherein the locking concave portion is formed at a base portion side of the trunk portion.

24. The glass run channel product according to claim 21, wherein at least one of the longitudinal-direction locking portion and the width-direction locking portion includes a concave portion that is recessed in a direction away from a central axis of the insertion hole,
wherein the trunk portion of the engaging member is formed with a locking convex portion that is locked to the concave portion, and
wherein the locking convex portion is locked to the concave portion in a state where the engaging member is inserted into the insertion hole.

25. The glass run channel product according to claim 24, wherein the concave portion is formed at the inner wall that is located at an outer circumferential side of the base bottom portion, and
wherein the locking convex portion is formed at a tip side of the trunk portion.

* * * * *